United States Patent
Tanimoto et al.

(10) Patent No.: US 6,907,526 B2
(45) Date of Patent: Jun. 14, 2005

(54) IC CARD AND MICROPROCESSOR

(75) Inventors: Chiaki Tanimoto, Yokohama (JP);
Kunihiko Nakada, Koganei (JP);
Takashi Tsukamoto, Kodaira (JP);
Shigeo Hirabayashi, Tokyo (JP);
Hiroshi Watase, Kodaira (JP);
Masatoshi Takahashi, Akishima (JP);
Yuuichirou Nariyoshi, Kodaira (JP)

(73) Assignees: Renesas Technology Corp., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 832 days.

(21) Appl. No.: 09/754,190

(22) Filed: Jan. 5, 2001

(65) Prior Publication Data

US 2001/0016910 A1 Aug. 23, 2001

(30) Foreign Application Priority Data

Jan. 12, 2000 (JP) .................................... 2000-003295
Jan. 12, 2000 (JP) .................................... 2000-003297
Oct. 23, 2000 (JP) .................................... 2000-323178

(51) Int. Cl.$^7$ ................................................ H04L 9/00
(52) U.S. Cl. .......................... 713/174; 713/189; 380/46
(58) Field of Search ................................ 713/172, 174, 713/189, 192–194, 200; 380/28, 30, 46; 708/100, 103, 135, 250

(56) References Cited

U.S. PATENT DOCUMENTS

| 4,804,825 | A | * | 2/1989 | Bitoh .......................... 235/380 |
| 4,864,491 | A | * | 9/1989 | Ohuchi ......................... 712/25 |
| 5,961,578 | A |   | 10/1999 | Nakada ....................... 708/491 |
| 6,064,740 | A | * | 5/2000 | Curiger et al. .............. 380/265 |

FOREIGN PATENT DOCUMENTS

JP          10-69222       3/1998

* cited by examiner

Primary Examiner—Hosuk Song
(74) Attorney, Agent, or Firm—Miles & Stockbridge, P.C.

(57) ABSTRACT

Disclosed herein are an IC card and a microcomputer which have implemented the strengthening of security and the speeding up and enhancement of signal processing for the security. In an IC card, which is supplied with an operating voltage by an electrical connection between each of external terminals and a read/write device, and includes an input-output operation of data with an encoding process or a decoding process, a disturbance-aimed processing operation is included in the encoding process or decoding process to uniformalize timings provided to operate an internal circuit and its operating current. In a microcomputer having a module configuration including an input-output operation of data with an encoding process or a decoding process, a disturbance-aimed processing operation is included in the encoding process or decoding process to uniformalize timings provided to operate an internal circuit and its operating current.

13 Claims, 16 Drawing Sheets

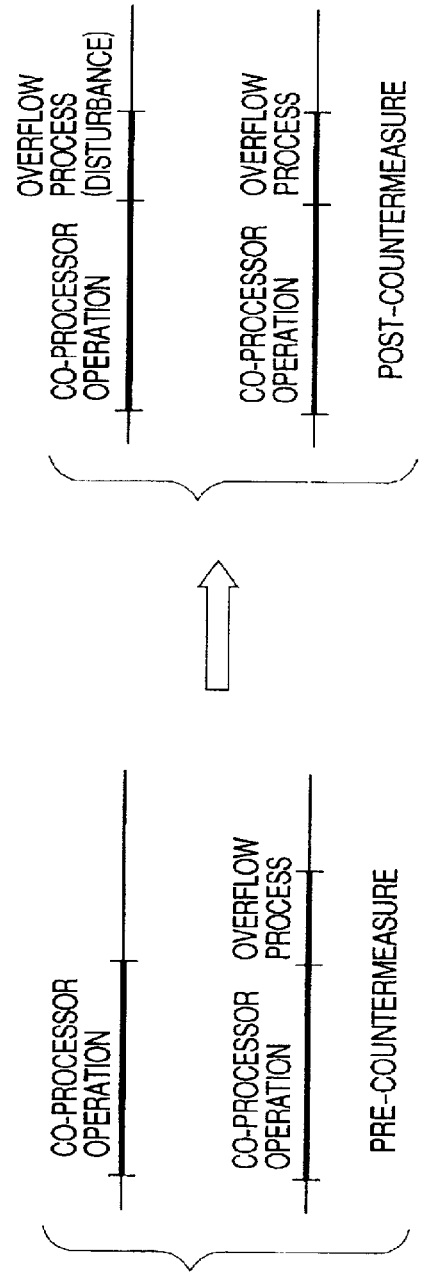
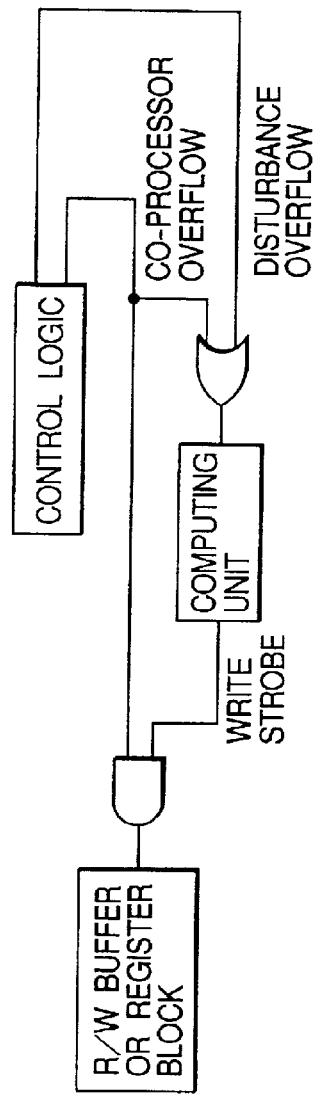

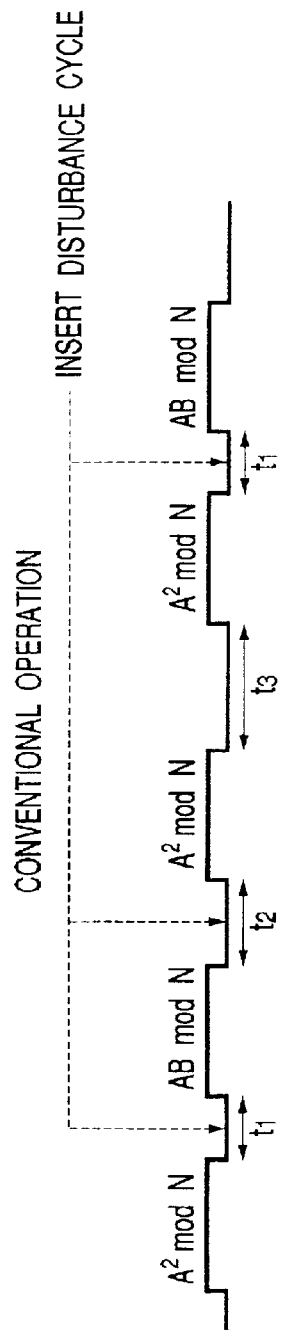
FIG. 15(a) CONVENTIONAL OPERATION
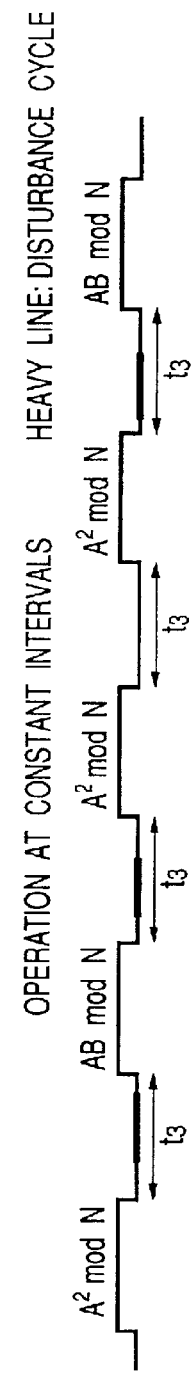
FIG. 15(b) OPERATION AT CONSTANT INTERVALS
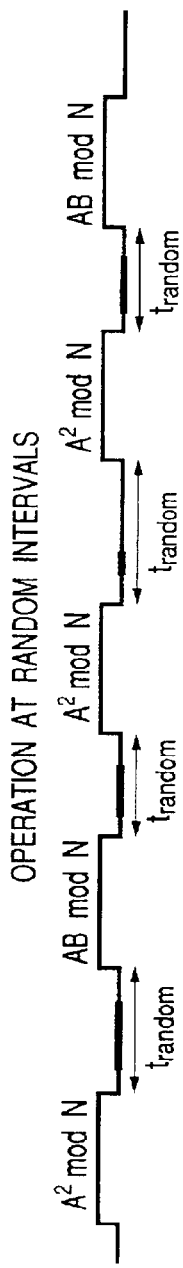
FIG. 15(c) OPERATION AT RANDOM INTERVALS

IC CARD AND MICROPROCESSOR

BACKGROUND OF THE INVENTION

The present invention relates to an IC card and a microcomputer, and particularly to a technology effective for application to a security technology used for ones like an IC card and a stored-program one-chip microcomputer, each of which includes a CPU and a memory and performs data processing using an encoding key.

Japanese Patent Application Laid-Open No. Hei 10(1998)-69222 discloses, as an example, a technology wherein in an IC card which effects an encoding process or a decoding process on data by using key information stored in a memory, a delay process for losing a time correlation with the contents of the key information is executed during or before or after the execution of the encoding process or decoding process to set up against an operation analytical method like a TA (Timing Attack) method of estimating the contents of execution and an encoding key by using the difference in processing time.

It has recently been suggested that there is a possibility that the contents of an encoding process and an encoding key will easily be estimated by observing and analyzing current consumption at the time that an IC card is executing the encoding process. This has been described in 8.5.1.1 Passive protective mechanism (pp 263) of "Smart Card Handbook", by W. Rankl & W. Effing, John Wiley & sons Co., Ltd.

That is, an SPA (Simple Power Analysis) method analyzes an encoding key and processed data according to the difference between operational or computational instructions or the difference between waveforms of consumed currents developed due to the difference in processed data. A DPA (Differential Power Analysis) method statistically processes waveforms of currents consumed and thereby estimates an encoding key. In the DPA method, a supposed encoding key is applied to a certain portion of DES, for example, and while a plaintext is being changed, the waveforms of the consumed currents are measured and statistics thereabout are collected. This work is repeated while the encoding key is being changed in various ways, and the current waveform exhibits a large peak in the case of a proper key.

As described in the Publication referred to above, the delay process, which has taken into consideration only the TA (Timing Attack) method, is not capable of losing even the correlation of current consumption based on an actual computation or operation. This is not capable of setting up against the operation analytical method like such a SPA or DPA method as to observe the waveform of each current consumed. To this end, the inventors of the present application have led to the development of a security technology capable of more reliably preventing decoding of the contents of an encoding process and an encoding key, based on the observation of the current consumption as described above with respect to ones each of which performs a fixed or regular data processing operation according to a stored-program as in the IC card and the microcomputer mounted to a module like an IC card or the like.

SUMMARY OF THE INVENTION

An object of the present invention is to provide an IC card and a microcomputer, which have implemented the strengthening of security. Another object of the present invention is to provide an IC card and a microcomputer, which have implemented the speeding up of signal processing for security and its enhancement. The above, other objects, and novel features of the present invention will become apparent from the description of the present specification and the accompanying drawings.

A summary of a typical one of the inventions disclosed in the present application will be described in brief as follows: In an IC card supplied with an operating voltage by an electrical connection between each of external terminals and a read/write device, and including an input-output operation of data with an encoding process or a decoding process, a disturbance-aimed processing operation similar to an original processing operation is included in the encoding process or decoding process to thereby uniformalize timings provided to operate an internal circuit and its operating current.

A summary of another typical one of the inventions disclosed in the present application will be described in brief as follows: In a microcomputer having a module configuration including an input-output operation of data with an encoding process or a decoding process, a disturbance-aimed processing operation similar to an original processing operation is included in the encoding process or decoding process to thereby uniformalize timings provided to operate an internal circuit and its operating current.

A summary of a further typical one of the inventions disclosed in the present application will be described in brief as follows: In an IC card supplied with an operating voltage by an electrical connection between each of external terminals and a read/write device, and including an input-output operation of data with an encoding process or a decoding process based on an encoding processing computing unit operated in response to instructions given from a central processing unit, the encoding processing computing unit is provided with each of registers, which stores data used for a computation for the encoding process or decoding process in plural bit units, and data necessary prior to the encoding process or the decoding process is taken in such a register.

A summary of a still further one of the inventions disclosed in the present application will be explained in brief as follows: In a microcomputer having a module configuration including an input-output operation of data with an encoding process or a decoding process based on an encoding processing computing unit operated in response to instructions given from a central processing unit, the encoding processing computing unit is provided with each of registers, which stores data used for a computation for the encoding process or decoding process in plural bit units, and data necessary prior to the encoding process or the decoding process is brought to the register.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 13(a) and 13(b) are timing charts for describing the details of the operation of another embodiment of the co-processor according to the present invention;

FIG. 14 is a block diagram showing one embodiment for implementing the operation of the co-processor shown in FIGS. 11 through 13;

FIGS. 15(a) to 15(c) are timing charts for describing the operation of a further embodiment of a co-processor according to the present invention;

DESCRIPTION OF THE PREFERRED EMBODIMENTS

Preferred embodiments of the present invention will hereinafter be described in detail with reference to the accompanying drawings.

Figure 1:
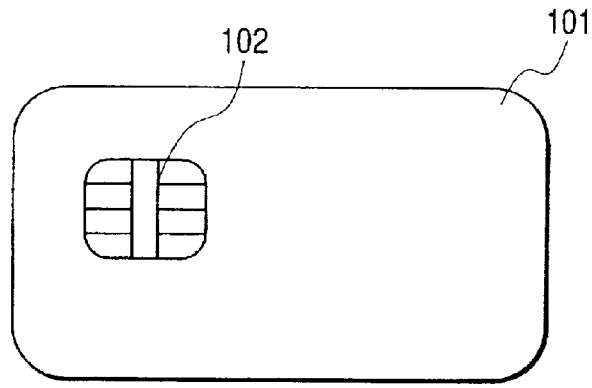
FIG. 1 is an external view showing one embodiment of an IC card to which the present invention is applied.

FIG. 1 shows an external view of one embodiment of an IC card to which the present invention is applied. The IC card has a card 101 made up of a plastic case, and a chip for the IC card, which comprises an unillustrated one-chip microcomputer, etc. mounted inside the card 101. Further, the IC card has a plurality of contacts (electrodes) 102 respectively connected to external terminals of the IC card chip. The plurality of contacts 102 include a power supply terminal VCC, a power reference potential terminal VSS, a reset input terminal $\overline{\text{RES}}$, a clock terminal CLK, and data terminals I/O-1/$\overline{\text{IRQ}}$ and I/O-2/$\overline{\text{IRQ}}$ such as described later with reference to FIG. 2. The IC card is supplied with power from an external coupling device like an unillustrated reader/writer through the contacts 102 and performs data communications with the external coupling device.

Figure 2:
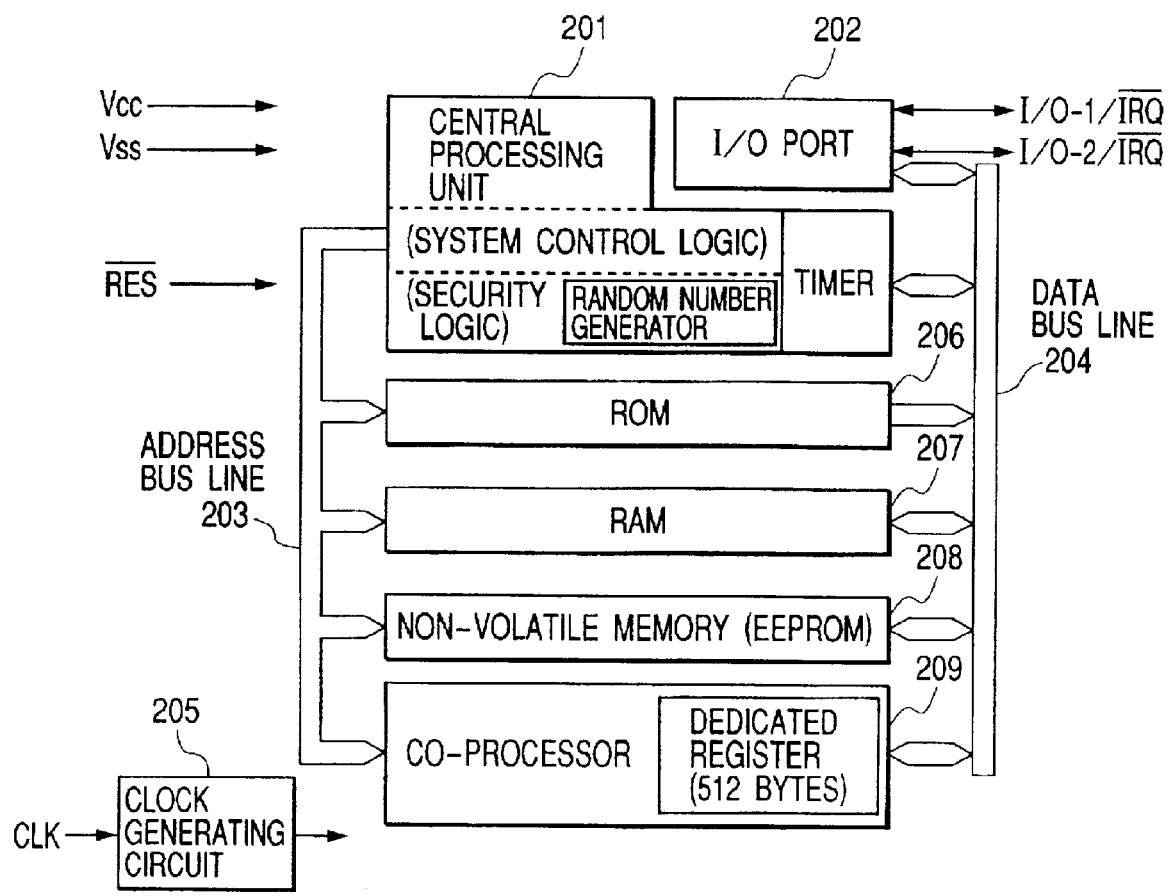
FIG. 2 is a schematic block diagram illustrating one embodiment of an IC card chip mounted on the IC card according to the present invention.

FIG. 2 is a schematic block diagram of one embodiment of an IC card chip (microcomputer) mounted on the IC card according to the present invention. Although not restricted in particular, respective circuit blocks shown in the same drawing are formed on a single semiconductor substrate like monocrystalline silicon by the known MOS integrated circuit manufacturing technology.

The IC card chip according to the present invention is basically identical in configuration to the microcomputer. The configuration thereof comprises a clock generating circuit 205, a central processing unit (hereinafter might be called simply "CPU") 201, storage devices such as a ROM (Read Only Memory) 206, a RAM (Random Access Memory) 207, a non-volatile memory 208, etc., a co-processor 209 for performing computations or operations for encoding and decoding processing, an input/output port (I/O port) 202, etc.

The clock generating circuit 205 is a circuit which receives an external clock CLK supplied from the unillustrated reader/writer (external coupling device) through the corresponding contact 102 shown in FIG. 1, produces or forms a system clock signal synchronized with such an external clock signal and supplies it to the inside of the chip. The CPU 201 is a device for performing a logical operation, an arithmetic operation, etc. and controls a system control logic, a random number generator, a security logic and a timer, etc. The storage devices 206, 207 and 208 are respectively devices for storing programs and data therein. The co-processor 209 comprises a computing or arithmetic unit and a register for performing an exponential residue multiplying operation applicable to RSA cryptography or the like, and a control logic as will be described later. The I/O (input/output) port 202 is a device which communicates with the reader/writer. A data bus 204 and an address bus 203 are buses which connect the respective devices to one another.

Of the storage devices 206, 207 and 208, the ROM 206 is a memory to which the stored contents is fixed on a nonvolatile basis. This is a memory which principally stores a program therein. The volatile memory (hereinafter called "RAM") 207 is a memory capable of freely rewriting stored information. However, when the supply of power is discontinued, the stored contents is wiped out or evaporated.

Since the supply of the power is discontinued when the IC card is withdrawn from the reader/writer, the contents of the RAM 207 is not held.

The non-volatile memory (hereinafter called "EEPROM (Electrical Erasable Programmable Read Only Memory)") 208 is a non-volatile memory capable of rewriting the contents. Information temporarily stored therein is held thereinside even if the supply of the power is stopped. The EEPROM 208 has the need for its rewriting or updating and is used to store data to be held even if the IC card is drawn from the reader/writer. When the IC card is used as a prepaid card, for example, the prepaid units or the like are updated for each usage. Since the prepaid units or the like in this case are required to be stored and held in the IC card even if it is withdrawn from the reader/writer, they are held by the EEPROM 208.

The CPU 201 is configured in a manner similar to a so-called microprocessor. That is, although its details are not illustrated, the CPU 201 includes thereinside, instruction registers, a micro instruction ROM for decoding an instruction written into the instruction register and forming various microinstructions or control signals, an arithmetic circuit, general-purpose registers (RG6 or the like), input/output circuits such as a bus driver and a bus receiver, etc connected to an internal bus BUS. The CPU 201 reads an instruction stored in the ROM 206 or the like and performs an operation corresponding to the instruction. The CPU 201 performs capturing of external data inputted via the I/O port 202, reading of each instruction and data like fixed data necessary to execute the instruction from the ROM 206, and operation control or the like of the writing of data into the RAM 207 or EEPROM 208 and reading of data therefrom.

The CPU 201 receives a system clock signal generated from the clock generating circuit 205 therein and is thereby operated according to operating timing and a cycle determined based on the system clock signal. The CPU 201 has an internal principal part comprised of a CMOS circuit which comprises P channel type MOSFETs and N channel type MOSFETs. Although not restricted in particular, the CPU 201 includes a static operable CMOS static circuit like a CMOS static flip-flop, and a CMOS dynamic circuit which performs the precharge of an electrical charge to a signal output node and the output of each signal to the signal output node in synchronism with the system clock signal.

As to security functions of the IC card, the RSA encoding processing computing unit (co-processor) 209 for performing an exponential remainder or residue computing operation applicable to the RSA cryptography or the like, which is used upon the transmission and reception of data between the IC card and the external device, is incorporated into the chip as a high-security function according to the invention of the present application in addition to a random number generator for automatically generating random numbers inside the chip, a timer function for generating interrupts at random, etc. A dedicated register is built in the present co-processor 209.

It is essential that a security system for an IC card needs a communication data encoding process. Even in the case of the present embodiment, a RSA encoding is used as a public key encryption method which is most frequently used at present. In such cryptography, an exponential residue multiplication $X^Y$ modN is used for both encoding and decoding but can be disassembled into two forms of residue multiplications $A^2$ modN and ABmodN according to the known calculation algorithm. That is, values $e_i$ of $Y=e_n e_{n-1} \ldots e_1$ are recognized or checked bit by bit in order from a high-order or upper $e_n$ to the least significant $e_1$. When $e_i=0$, only $A^2$ modN is computed, and when $e_i=1$, $A^2$ modN and ABmodN are computed. Thus, the modes or forms of two types of current waveforms corresponding to $e_i=0$ and 1 would appear since a process for determining whether i=0 after the computation of $A^2$ modN is carried out when $e_i=0$, and a process for determining whether i=0 after the computations of $A^2$ modN and ABmodN, are carried out when $e_i=1$.

When the co-processor 209 is used as in the present embodiment, its current consumption is relatively large in the whole current consumption in the IC card. Therefore, the observation of a current waveform at this portion makes it possible to relatively easily identify the operating mode of the co-processor. There is also a possibility that the value of the encoding key Y will be decoded by the DPA method and SPA method. Thus, a disturbance-aimed computation is inserted in the co-processor 209 employed in the present embodiment upon computing the exponential residue multiplication $X^Y$ modN used for both the encoding and decoding. That is, as shown in a timing chart of FIG. 3 and a flowchart of FIG. 4, both computations of $A^2$ modN and ABmodN are always carried out even if $e_i=0$ or 1.

Figure 3A:
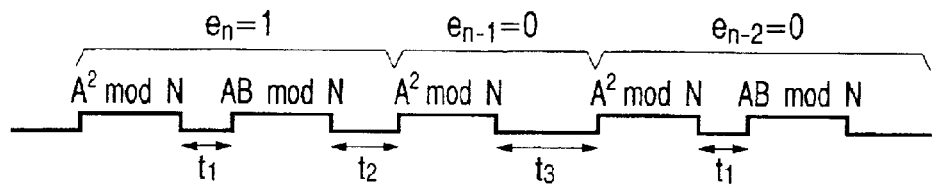
FIGS. 3(a) and 3(b) are timing charts for describing the operation of one embodiment of a co-processor according to the present invention.
Figure 3B:
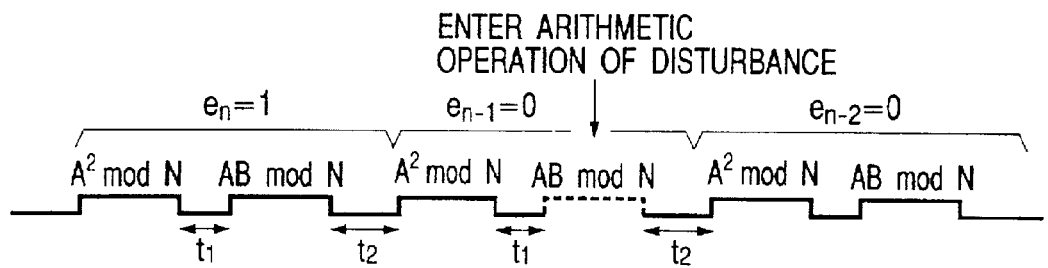
Figure 4:
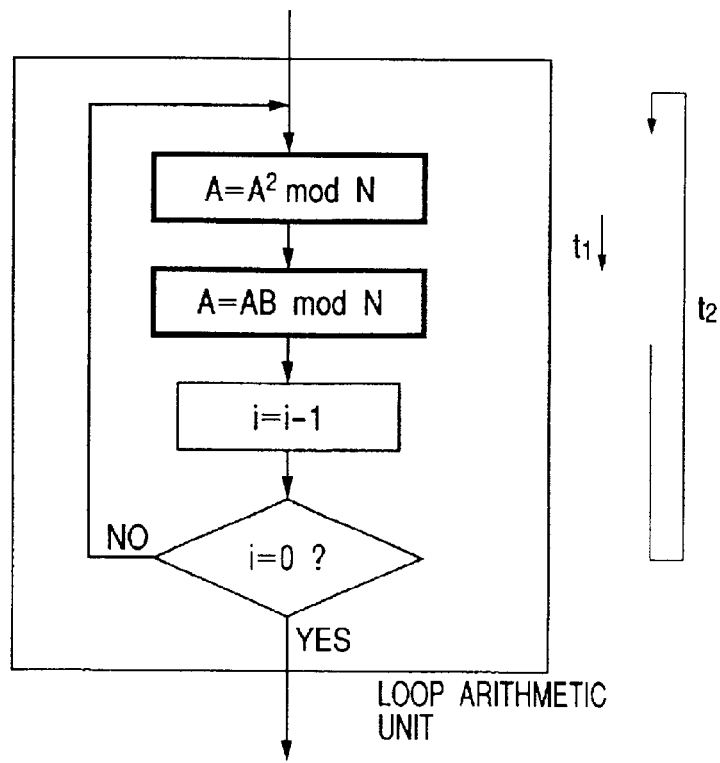
FIG. 4 is a flowchart for describing the operation of the co-processor shown in FIG. 3.

As shown in FIG. 3(a) in the timing chart of FIG. 3, $A^2$ modN is originally computed when $e_n=1$. According to a decision 1 of $e_n$, a time t1 elapses and ABmodN is computed. After its computation or operation, i is decremented by (n−1), and a time t2 is spend for the determination of i=0. Next, when the next bit $e_{n-1}=0$, $A^2$ modN is computed. A decision as to $e_{n-1}=0$ is made and i is decremented by (n−2). Thus, a time t3 is spent for the determination of i=0. When the next bit $e_{n-2}=1$, $A^2$ modN is computed. According to a decision 1 of $e_{n-2}$, the time t1 elapses and ABmodN is computed. After its computation, i is decremented by (n−3), and the time t2 is spend for the determination of i=0. Similarly, operations similar to above are subsequently repeated up to $e_1$.

In the co-processor 209 employed in the present embodiment, ABmodN is computed after the computation of $A^2$ modN regardless of either 0 or 1 of each individual bits $e_i$ of the encoding key Y. As when $e_{n-1}=0$ in FIG. 3(b), the computation of ABmodN at the time that $e_i$ is a logical 0, is inserted as a disturbance-aimed operation. That is, the computing operations can be established as uniformalized operating timings and currents at which as shown in the timing chart of FIG. 3(b) and the flowchart of FIG. 4, a time t1 including, for example, a decision time for making a decision as to $e_i$ is spent during the computing operations of A modN and ABmodN, and a decrement operation of i and a time t2 required to make a decision as to i=0 are spent during the computing operations of ABmodN and $A^2$ modN corresponding to the next bit. Since, however, the process for the decision of $e_i$ is omitted from the flowchart of FIG. 4 in the present embodiment because the result thereof is not defined as a computing-operation branch condition.

Figure 5:
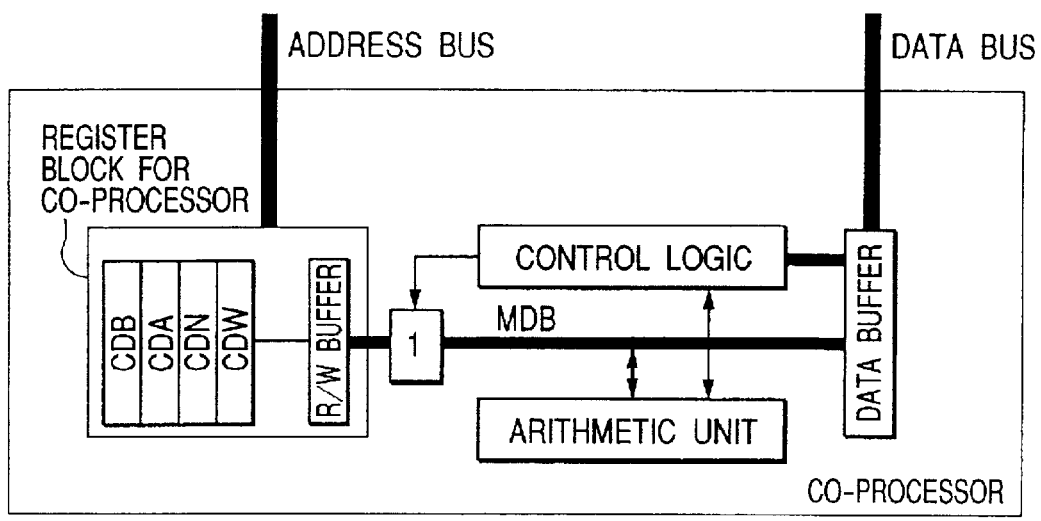
FIG. 5 is a block diagram showing one embodiment of the co-processor shown in FIG. 3.

FIG. 5 is a block diagram of one embodiment of the co-processor. The present embodiment principally comprises an arithmetic unit, a control logic, and a dedicated register block. The final result of an exponential residue computation is transmitted to a central processing unit CPU through a data buffer and a data bus. The dedicated register performs a selecting operation in response to an address signal supplied from an address bus.

In the present embodiment, a gate circuit 1 is provided between an internal bus MDB and a read/write buffer (R/W Buffer) of the register block. The gate circuit 1 is controlled by the control logic so as to close its opened gate after the result of computation of $A^2$ modN has been taken in a predetermined register CDA through the internal bus MDB and the read/write buffer if $e_i$ is a logical 0. That is, when the above result of computation is captured by the read/write buffer, the gate is subsequently closed so as to inhibit the writing of new data into the read/write buffer. Thus, the result of computation of ABmodN to be carried out subsequently is handled as invalid data. If $e_i$ is given as a logical 1, then the gate circuit 1 remains kept in its gate-open state.

Figure 6:
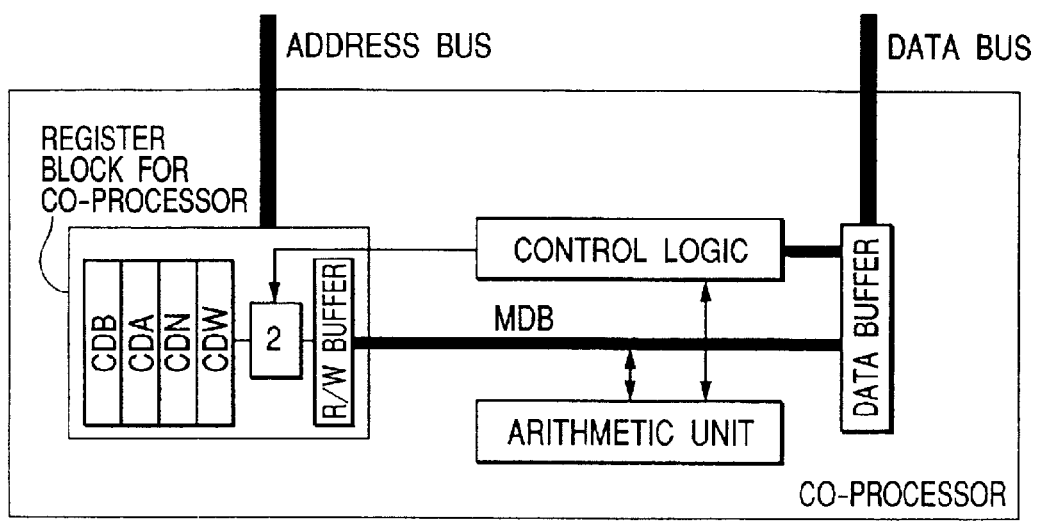
FIG. 6 is a block diagram illustrating one embodiment for implementing the operation of the co-processor shown in FIG. 3.

FIG. 6 is a block diagram of another embodiment of the co-processor. In the present embodiment, a gate circuit 2 is provided between a read/write buffer (R/W Buffer) of a register block and respective registers. The gate circuit 2 is controlled by a control logic in a manner similar to above so as to close its open gate after the result of computation of $A^2$ modN has been taken in a predetermined register CDA through an internal bus MDB and the read/write buffer if $e_i$ is given as a logical 0. That is, when the above result of computation is captured by the register CDA, the gate is subsequently closed so as to inhibit the writing of new data into the register CDA. Thus, the result of computation of ABmodN to be carried out subsequently is written into the read/write buffer up thereto but actually handled as invalid data. If $e_i$ is given as a logical 1, then the gate circuit 2 remains kept in its gate-open state.

Figure 7:
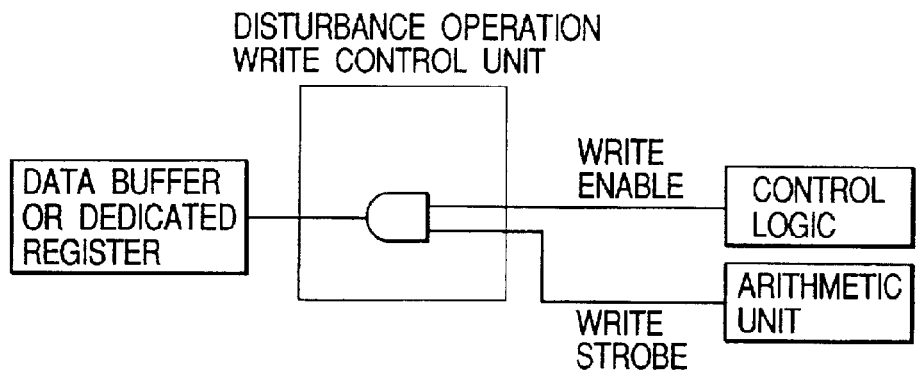
FIG. 7 is a block diagram depicting another embodiment of the co-processor shown in FIG. 3.

FIG. 7 is an internal configuration diagram of one embodiment of the gate circuit. A disturbance operation write control unit comprises an AND gate circuit which has one input supplied with a write enable signal delivered from a control logic and the other input supplied with a write strobe signal generated by an arithmetic unit. A signal outputted from the gate circuit is transmitted to a data buffer (R/W Buffer) and a dedicated register as a write strobe signal.

The present embodiment aims to select timing provided to generate a write strobe signal for providing instructions for the operation of writing of data into the register or data buffer as an alternative to the control on the transmission of the result of computation itself. That is, when $e_i=0$, the write enable signal is brought to a low level after the result of computation of $A^2$ modN is outputted, whereby the gate of the AND gate circuit is closed. When $e_i=1$ in reverse, the control logic keeps the write enable signal as a high level as it is, and the write enable strobe signal produced from the arithmetic unit is transmitted to the data buffer or the dedicated register as it is. Since it is not necessary to provide a plurality of gate circuits in association with the result of computation A comprised of plural bits in such a configuration, the present embodiment can be simplified.

Figure 8:
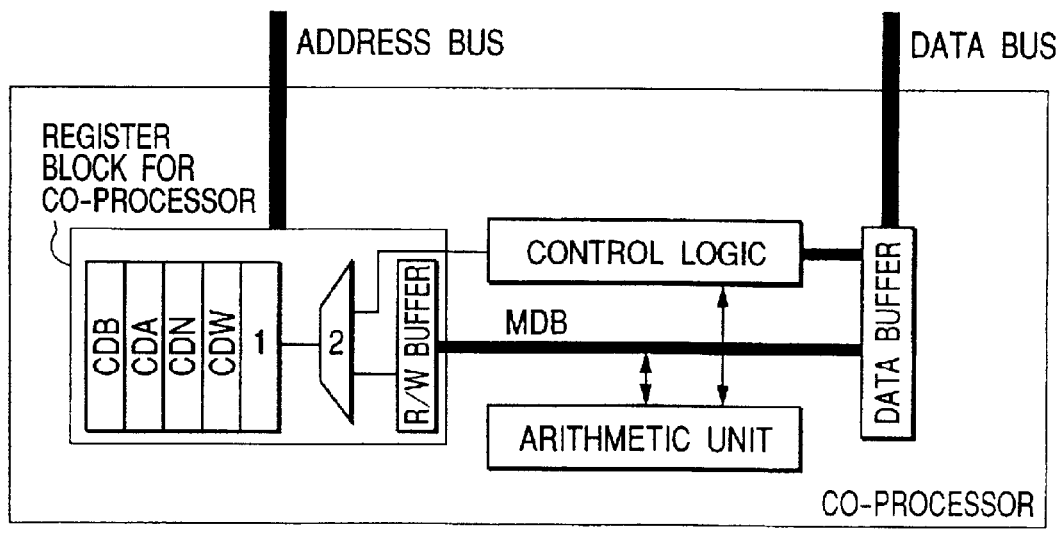
FIG. 8 is a block diagram showing another embodiment of the co-processor shown in FIG. 3.

FIG. 8 is a block diagram of a further embodiment of the co-processor. In the present embodiment, a selector 2 is provided between a read/write buffer (R/W Buffer) of a register block and respective registers, and a disturbance register 1 is provided in the register block. The selector 2 is controlled by a control logic in a manner similar to the above and forms such a signal path that the result of computation of $A^2$ modN is written into a predetermined register CDA through an internal bus MDB and a read/write buffer if $e_i$ is given as a logical 0, followed by formation of such a signal path as to select the disturbance register 1.

That is, when the result of computation is taken in the register CDA, the selector 2 selects the disturbance register 1 subsequently. Therefore, the writing of new data into the register CDA is prohibited and the result of computation of ABmodN to be carried out subsequently is written into the disturbance register. If $e_i$ is given as a logical 1, then the selector 2 always selects the register CDA. Since the computational results can be made precisely identical as viewed from current waveforms when $e_i$ is given as the logical 0 and 1 inclusive of the operation of writing the results into the registers in the present configuration, it is possible to make it difficult to perform decoding using the current waveforms.

Figure 9A:
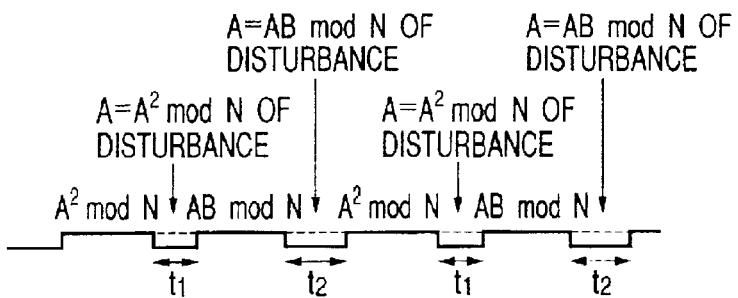
FIGS. 9(a) and 9(b) are configuration diagrams for describing the operation of another embodiment of a co-processor according to the present invention.
Figure 9B:
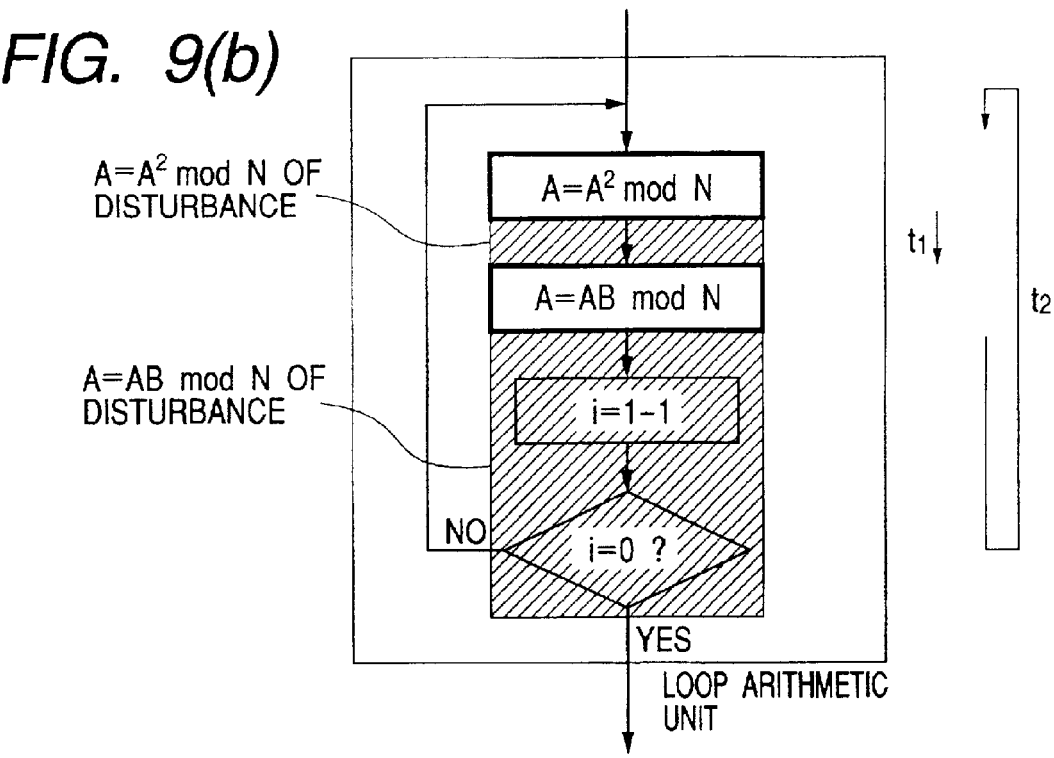

FIG. 9 is a configuration diagram for describing the operation of the further embodiment of the co-processor according to the present invention. In a timing chart shown in FIG. 9(a) and a flowchart shown in FIG. 9(b), $A^2$ modN is continuously carried out as a disturbance computing operation even during a time t1 required to make a decision as to $e_i$ after the computation of $A^2$ modN ad described above, followed by transition to the computation of ABmodN.

After its computation, i is decremented by (−1) and a time t2 is spent for the determination of i=0. However, even during that time, the above computation of ABmodN is continuously carried out. Similarly, operations similar to the above are subsequently repeated till $e_1$. Since the above computing operation continues regardless of when $e_i$ is given as the logical 0 and 1 during the computing operation, a particular feature cannot be found out as viewed from the standpoint of each current waveform in the case of such a configuration, it is possible to make it difficult to perform decoding using the current waveform.

Figure 10:
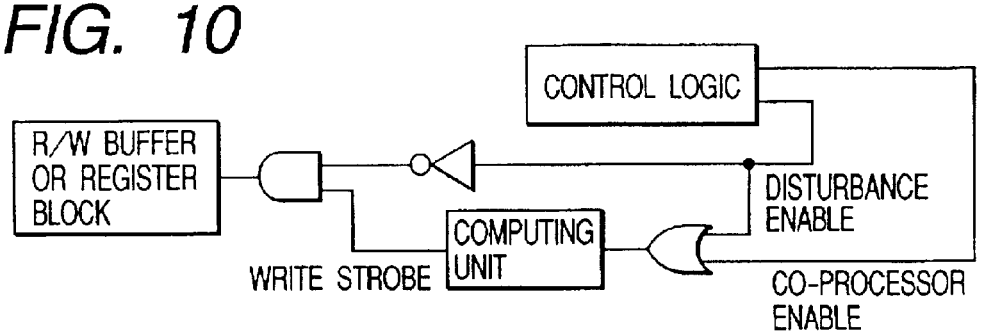
FIG. 10 is a block diagram showing one embodiment for implementing the operation of the co-processor shown in FIG. 9.

FIG. 10 is a block diagram of one embodiment for implementing the operation of the co-processor shown in FIG. 9. A control logic transmits a disturbance enable signal and a co-processor enable signal. The disturbance enable signal and the co-processor enable signal are inputted to an arithmetic unit through an OR gate circuit. Therefore, even when the disturbance enable signal is active in addition to the time when the co-processor enable signal is active, the arithmetic unit is activated so as to perform a computing operation.

The disturbance enable signal is supplied to one input of an AND gate circuit through an inverter circuit, whereas a write strobe signal produced from the arithmetic unit is supplied to the other input of the AND gate circuit. That is, the transmission of the write strobe signal formed by the arithmetic unit can selectively be stopped according to the disturbance enable signal. When the co-processor enable signal is made active and the above normal computing operation is completed, a write strobe signal for outputting the result of its computation is formed. Thus, when the co-processor enable signal is active, an inverted signal of the disturbance enable signal is brought to an active level and controls so as to open the gate of the AND gate circuit. Therefore, the normal result of computation is written into a R/W buffer or a predetermined register of a register block, based on the write strobe signal.

When the normal computing operation is finished, the disturbance enable signal is made active and gives instructions for the computing operation to the arithmetic unit. While the write strobe signal is formed according to the completion of this computation, the gate of the AND gate circuit remains closed by the inverted signal of the disturbance enable signal. Therefore, the write strobe signal produced by the disturbance-aimed computing operation is not transmitted to the R/W buffer or the predetermined register of the register block. Thus, the result of the disturbance-aimed computation is wiped out or erased as invalid data.

Figure 11A:
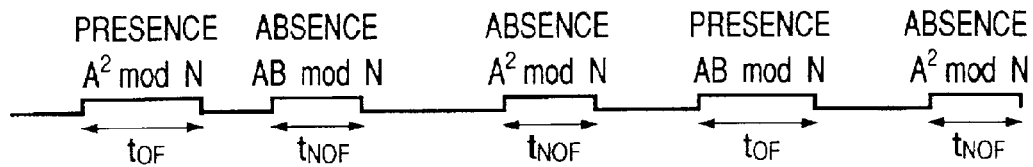
FIGS. 11(a) and 11(b) are timing charts for describing the operation of another embodiment of the co-processor according to the present invention.
Figure 11B:
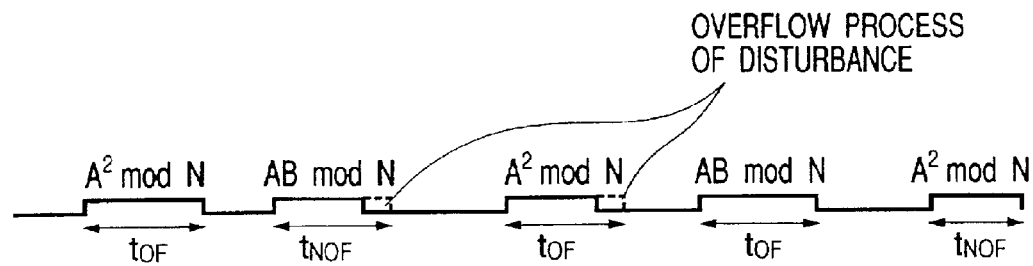

FIG. 11 is a timing chart for describing the operation of the further embodiment of the co-processor according to the present invention. Even when the disturbance-aimed computation is inserted as in the embodiment shown in FIG. 3, and $e_i$ is uniformalized and $A^2$ modN and ABmodN are computed as one pair as shown in the timing chart of FIG. 11(a), ones (presence) of computational results, each of which needs an overflow process, and ones (absence) thereof each of which needs no overflow process, are produced in each individual computations.

Since such an overflow process makes a computing time longer, either the presence or absence of the overflow process can be identified as viewed from the standpoint of each current waveform. Since the estimation of the contents of computation and computed data is also considered to be not impossible from the characteristic of each current waveform, overflow processes are inserted in the same manner as when necessary even with respect to the computations which need no overflow process as shown in the timing chart of FIG. 11(b) in the present embodiment. That is, this aims to apparently neutralize or invalidate the identification of the overflow process in order to uniformly execute the operation for each overflow process upon all the computations of $A^2$ modN and ABmodN.

Figure 12:
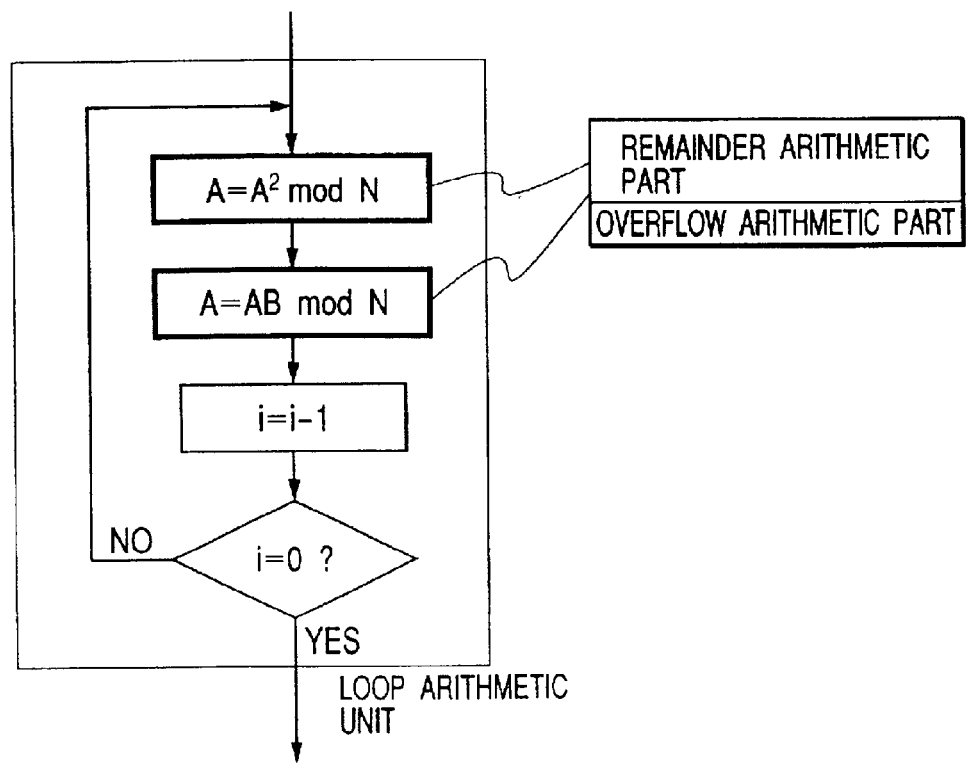
FIG. 12 is a flowchart for describing the operation of another embodiment of the co-processor according to the present invention.

FIG. 12 is a flowchart for describing the operation of the further embodiment of the co-processor according to the present invention. The present flowchart corresponds to FIG. 11(b). Each of the computations of $A^2$ modN and ABmodN comprises a remainder or residue arithmetic part and an overflow arithmetic part, which execute the overflow computing process regardless of the result of computation.

FIG. 13 is a timing chart for describing the details of the operation of the further embodiment of the co-processor according to the present invention. Before countermeasures taken in the present embodiment, the two types corresponding to the computational result subjected to the overflow process and one free of the overflow process exist in association with the results of the co-processor computations of $A^2$ modN and ABmodN upon the co-processor computations. After countermeasures taken in the present embodiment, however, the overflow processes are always executed regardless of the results of co-processor computations of $A^2$ modN and ABmodN upon the co-processor computations. Therefore, the overflow process effected on the computing operation which eliminates the need for the overflow process is originally defined as a disturbance-aimed operation.

FIG. 14 is a block diagram of one embodiment for implementing the operation of the co-processor shown in FIGS. 11 through 13. A control logic transmits a disturbance overflow signal and a co-processor overflow signal. The disturbance overflow signal and the co-processor overflow signal are inputted to an arithmetic unit through an OR gate circuit. Therefore, even when the disturbance overflow signal is active in addition to the time when the co-processor overflow signal is active, the arithmetic unit is activated so as to perform an overflow processing operation.

The co-processor overflow signal is supplied to one input of an AND gate circuit, whereas a write strobe signal produced from the arithmetic unit is supplied to the other input of the AND gate circuit. That is, the transmission of the write strobe signal formed by the arithmetic unit can selectively be stopped when the co-processor overflow signal is not at an active level. That is, when the co-processor overflow signal is not at the active level, the arithmetic unit performs an overflow process according to the disturbance overflow signal. Therefore, the write strobe signal formed by such an overflow process is made invalid by closing the gate of the gate circuit. Thus, when the normal overflow process is finished, a write strobe signal for outputting the result of its process is formed and the result of the process is written into a R/W buffer or a predetermined register of a register block.

On the other hand, when the disturbance overflow signal is made active and thereby gives instructions for an overflow processing operation to the arithmetic unit, a write strobe signal produced by the overflow process serves so as to close the gate of the AND gate circuit according to the co-processor overflow signal. Therefore, the write strobe signal produced by the disturbance-aimed overflow processing operation is not transmitted to the R/W buffer or the predetermined register of the register block. Thus, the result of the disturbance-aimed overflow process is wiped out or erased as invalid data.

FIG. 15 is a timing chart for describing the operation of a still further embodiment of a co-processor according to the present invention. As shown in FIG. 15(a), $A^2$ modN is originally computed when $e_n=1$. According to a decision 1 of $e_n$, a time t1 elapses and ABmodN is computed. After its computation, i is decremented by (n–1), and a time t2 is spend for the determination of i=0. Next, when the next bit $e_{n-1}=0$, $A^2$ modN is computed. A decision as to $e_{n-1}=0$ is made and i is decremented by (n–2). Upon such a computing operation that a time t3 is spent for the determination of i=0, disturbance-aimed cycles are inserted into the times t1, t2 and t3 every computations referred to above.

In the timing chart shown in FIG. 15(b), the disturbance-aimed cycles are inserted so that the times set every computations are aligned with the longest time t3. Thus, since either computation $A^2$ modN or ABmodN is executed with the time t3 as an interval, each current waveform corresponding to a computing operation is apparently uniformalized and its identification is invalidated. In the timing chart shown in FIG. 15(c) on the other hand, disturbance-aimed cycles in which the time changes at random, are inserted into the intervals set every computations referred to above contrary to FIG. 15(b). Either computation $A^2$ modN or ABmodN is executed at random on a time basis. Therefore, as viewed from each current waveform, it is brought to a current value which is regardless of each computing operation and is irregular. In other words, since the arithmetic unit has non-reproducibility as viewed from a statistical point of view so as to vary each time even when the arithmetic unit is placed in the same state and under the same operation, its identification can be rendered invalid.

The disturbance-aimed cycles serve so as to change computing intervals through the use of the timer as shown in FIG. 2. Alternatively, a timer is provided outside the co-processor to await for the execution of the next computation until a predetermined time elapses. That is, the disturbance-aimed cycles are inserted into the times t1, t2 and t3 set every said computations shown in FIG. 15(a) upon the computation of the exponential residue multiplication by the co-processor, and an interrupt from the timer is made after the elapse of a predetermined time. Thus, the times t1, t2 and t3 are all kept constant as shown in FIG. 15(b), whereby the decoding from each current waveform is made difficult. Alternatively, random numbers generated by a random number generator are set to the timer, and the times t1, t2 and t3 may be changed at random every time as shown in FIG. 15(c). The times may be counted by software without using the timer.

Let's assume that the value of Y is processed by two bits or three bits with the objective of speeding up computations made by the co-processor upon exponential residue multiplication. An example of the two-bit processing will be explained as shown in a flowchart of FIG. 16, for example. Since, in this case, respective steps of $A^2$ modN, $A^2$ modN, ABmodN, i−2 and i=0? are always repeated, a processing time and a current waveform become constant even though such a disturbance-aimed computation as done bit by bit is not executed. It is therefore difficult to estimate the value of Y from each current waveform. Since the number of times that computations are executed, may also be 1.5 n times at all times in the case of the two-bit processing although 2 n times are taken at maximum in the case of the binary number system, this leads even to the shortening of an operating time.

Values of A, B and N are respectively transmitted and stored in registers dedicated for the co-processor until the computation of the co-processor is started. However, when the two-bit processing is done, four types of B values, $B_1$, $B_2$, $B_3$ and $B_4$ are required according to the value of Y. These values are calculated in advance and stored in a RAM, EEPROM or the like. They are transferred to the co-processor-dedicated registers. At this time, however, there is a possibility that a characteristic will appear in each in-transmission current waveform according to the values of the four types of B.

Let's now consider where data is transferred to a 16-bit precharge bus, for example. The precharge bus is a bus for aligning the values of all buses with "1" before data transmission. When data different in value but identical in the number of bits of "1", e.g., "88" and "11" are transferred to the bus in the form of a hexadecimal digit in which the number of bits of "1" is 2, each individual current waveforms are expected to be substantially identical to each other. This is because since the number of bits, which changed from "1" to "0", is the same, currents are consumed in the same manner and become identical in waveform to one another.

If data in which the number of bits of "1" is different by 1, e.g., "89" and "19" in which the number of bits of "1" is 3, are transferred, then the data is different in current consumption from data in which the number of bits of "1" is 2. This is because since the value of the bus changes from "1" to "0" by 13 bits, a current is consumed correspondingly. Therefore, the current consumption is reduced by one bit as compared with data in which the previous 14 bits change. There is generally regularity that the greater the changed number of bits, the higher each current waveform. The current waveform is apt to be intended for a current analysis in which transferred data is considered to be able to be estimated from the regularity. The following contrivances are carried out to avoid it.

Figure 17:
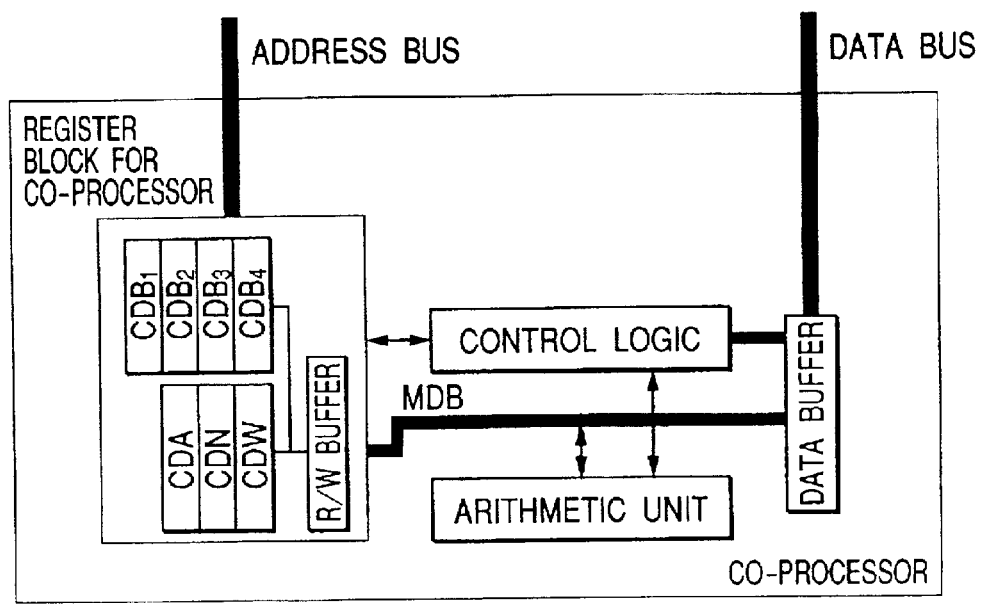
FIG. 17 is a block diagram illustrating a still further embodiment of a co-processor according to the present invention.
Figure 18:
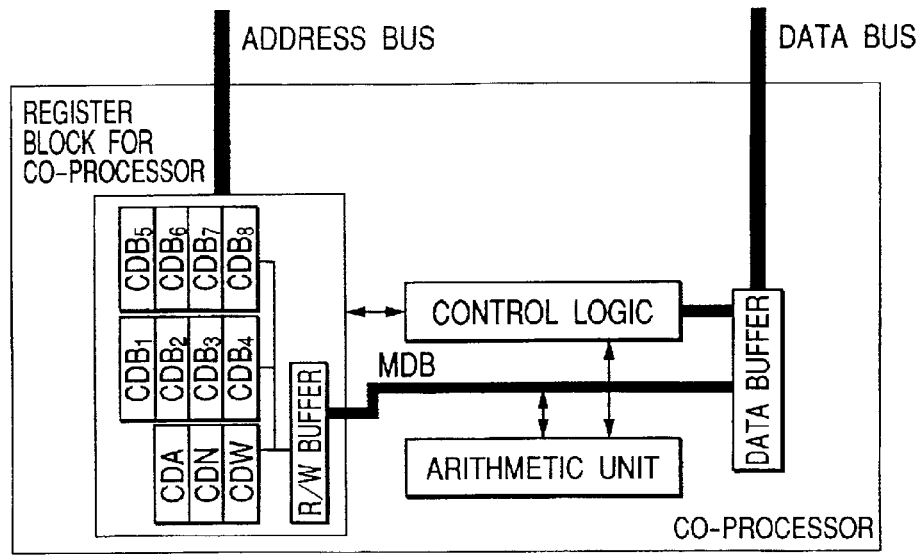
FIG. 18 is a block diagram depicting a still further embodiment of a co-processor according to the present invention.

FIGS. 17 and 18 are respectively block diagrams of still further embodiments of co-processors according to the present invention. The co-processors according to the present embodiments are respectively intended for two-bit processing and three-bit processing. That is, the co-processors increase in register capacity, and four types of B values, $B_1$ through $B_4$ are respectively stored in their corresponding registers of the co-processor in the cases of the two-bit processing, whereas eight types of B values, $B_1$ through $B_8$ are respectively stored in their corresponding registers of the co-processor in the case of the three-bit processing. Thus, the above transfer from a storage circuit (RAM) to the registers of the co-process through a data bus in the course of a computation becomes unnecessary, and a protection against the current analysis can be achieved.

| Control register (CCNT) | | | | |
|---|---|---|---|---|
| bit 7 | bit 6 | bit 2 | bit 1 | bit 0 |
| — | — | ... | $e_i$ | $e_{i-1}$ |

| Type of computation | | | |
|---|---|---|---|
| bit 2 | $e_i$ | $e_{i-1}$ | type of computation |
| 0 | 0 | 0 | A ← $A^2$ modN |
| 0 | 1 | 0 | A ← A modN |
| 0 | 1 | 1 | A ← A X N |
| 1 | 0 | 0 | A ← $AB_1$ modN |
| 1 | 0 | 1 | A ← $AB_2$ modN |
| 1 | 1 | 0 | A ← $AB_3$ modN |
| 1 | 1 | 1 | A ← $AB_4$ modN |

Figure 16:
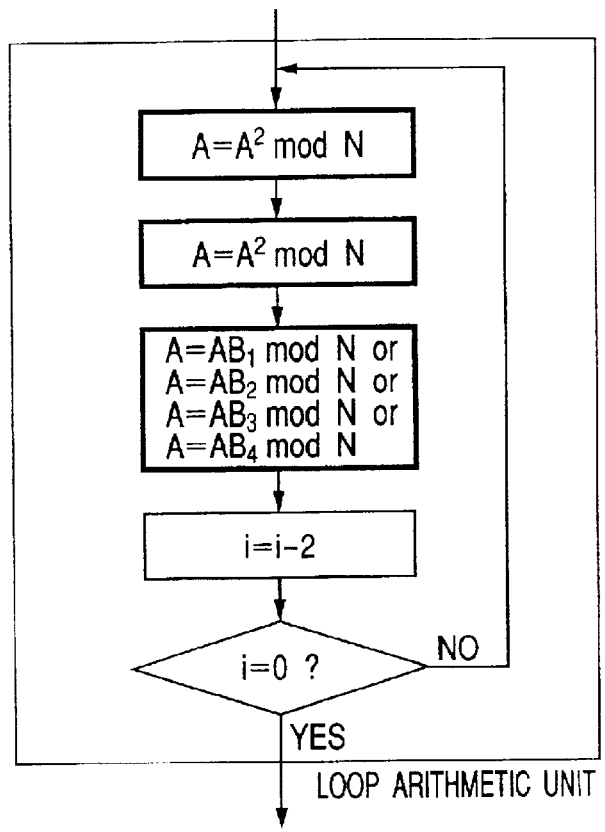
FIG. 16 is a flowchart showing another embodiment of an arithmetic operation of the co-processor according to the present invention.

That is, when the co-processor executes ABmodN in the flowchart shown in FIG. 16, the values of two bits (or three bits) of Y are applied to the bits of the control register (CCNT) of the co-processor in such a manner that it can select and execute the corresponding value from the proper B register CDB of the four (or eight in the case of the three-bit processing) as described below. In the case of the two-bit processing as in the control register and the type of computation referred to above, the co-processor is caused to select which computation of $AB_1$ modN, $AB_2$ modN, $AB_3$ modN and $AB_4$ modN should be executed.

Figure 19:
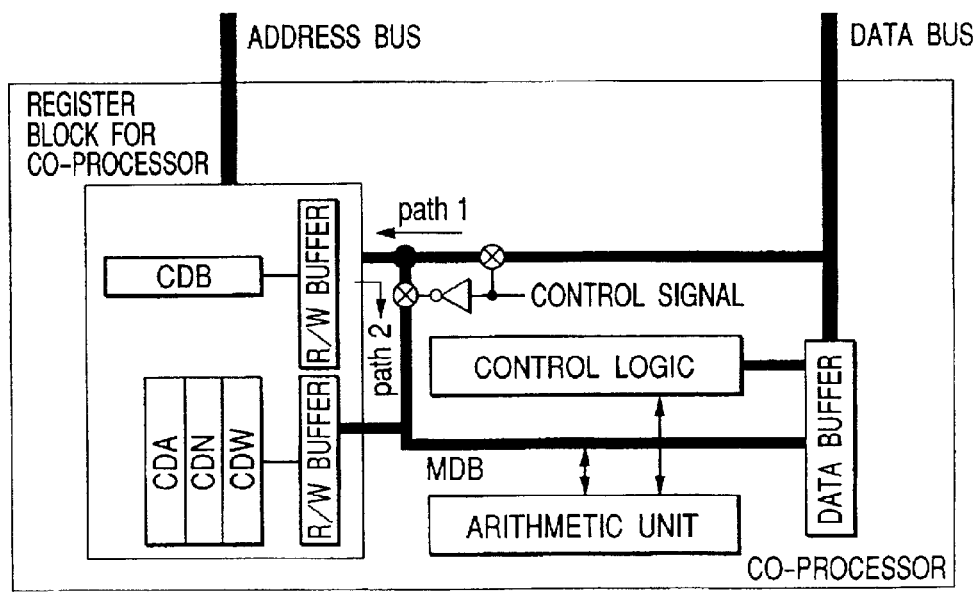
FIG. 19 is a block diagram showing a still further embodiment of a co-processor according to the present invention.

FIG. 19 is a block diagram of a still further embodiment of a co-processor according to the present invention. The co-processor according to the present embodiment is aimed at plural-bit processing such as two-bit processing, three-bit processing. In the present embodiment, a data bus is provided with switches, which allow data transmission while a computation is being carried out. Such a configuration is effective at performing both the shortening of an execution time and a countermeasure taken against a current analysis without an increase in the register capacity of the co-processor.

As registers (CDA, CDB, CDN and CDW) dedicated for the co-processor, four registers are exclusively used between a CPU and an arithmetic unit of the co-processor as shown in the same drawing. Efficiency is brought to the execution of the two-bit processing if while $A^2$ modN is being carried out twice, the value of B can be transferred from a RAM to the B register CDB in the register unit dedicated for the co-processor during that time.

I/Os of the A register CDA and the B register CDB of the co-processor are separated from each other. They are provided with read/write buffers (R/W Buffers) and configured so as to be able to operate independently. While the arithmetic unit is computing $A^2$ modN, the data bus is connected to a path 1 (path1) based on a control signal to thereby transfer the value of B from the RAM of the unillustrated CPU to the B register CDB through the separately-provided read/write buffer. Next, when the arithmetic unit executes ABmodN, a path 2 (path2) is selected based on a control signal to thereby send the B value of the B register to the arithmetic unit and unallow the unillustrated CPU to access the B register CDB. The present method is effective for countermeasures against the current analysis since a computing time is shortened because the operation of computing $A^2$ modN and the operation of transferring the B value are simultaneously carried out, and besides both the waveforms of currents consumed for the computation and transfer cannot be identified because they overlap one another.

Figure 20:
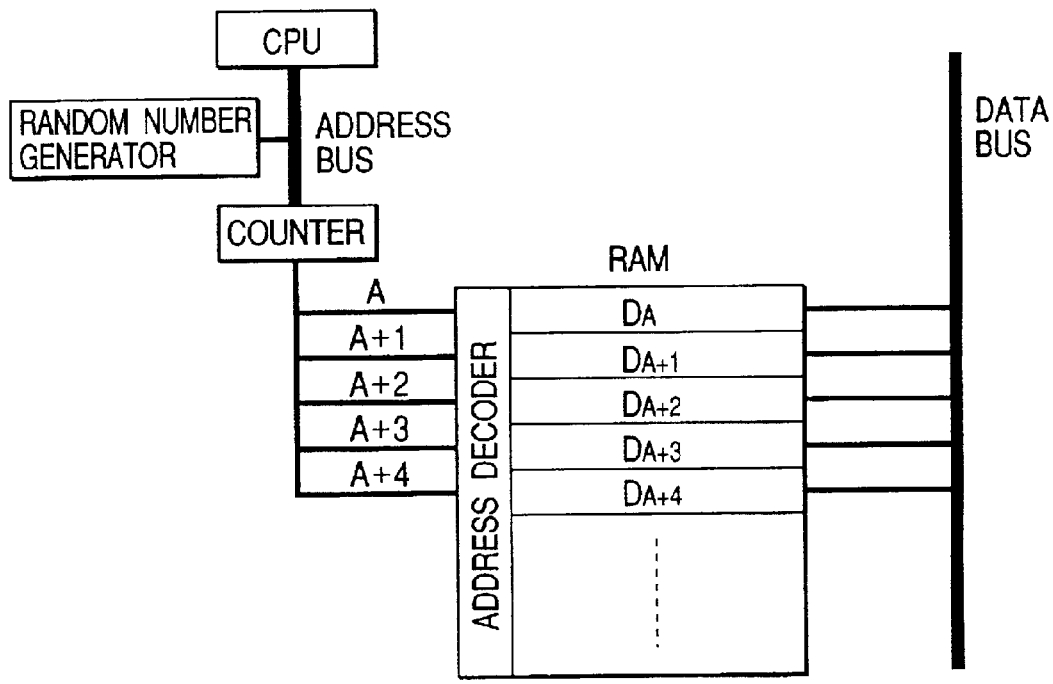
FIG. 20 is a fragmentary block diagram showing another embodiment of an IC card chip according to the present invention.

FIG. 20 is a fragmentary block diagram of another embodiment of a chip for an IC card according to the present invention. In the present embodiment, a memory is provided with a counter upon transfer of data between an encoding processing computing unit and a memory (RAM). The present embodiment aims to perform current disturbance when four types of values used for two-bit processing or eight types of values used for three-bit processing are transferred from the memory RAM provided outside a co-processor to a B register CDB in a register unit dedicated for the co-processor.

In the present embodiment, such an IC card chip as shown in FIG. 2 is provided with a counter on the RAM side. The RAM decodes address signals produced by the counter and transmits data to a data bus. At this time, a pseudo address produced by a random number generator is transmitted to an address bus. Thus, the correlation between the addresses and data is not established and hence a current analysis is rendered difficult.

Figure 21:
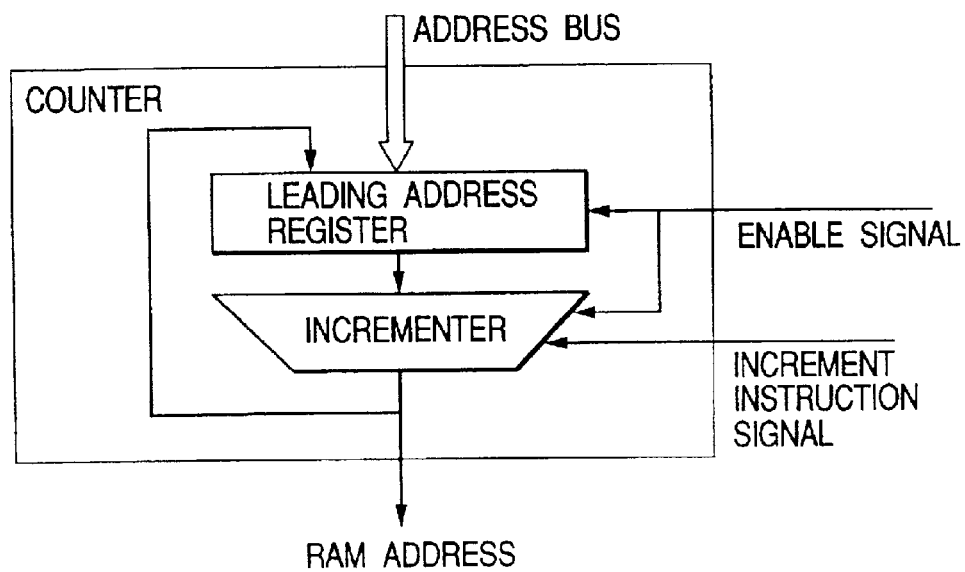
FIG. 21 is a block diagram illustrating one embodiment of a counter shown in FIG. 20.
Figure 22:
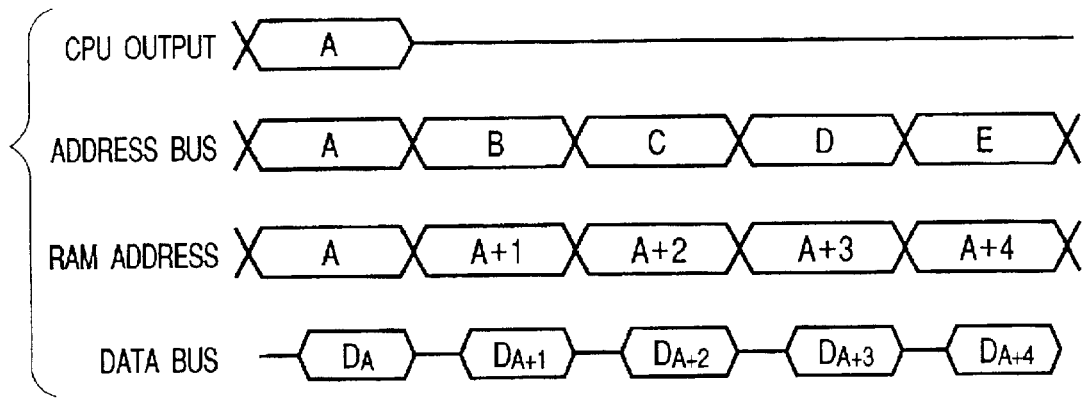
FIG. 22 is a timing chart showing one example of the operation of the IC card chip shown in FIG. 20.

FIG. 21 is a block diagram of one embodiment of the counter. The counter uses a head or leading address register for holding the first or initial address for a block to be transferred, and an incrementer, and is controlled according to an enable signal for enabling block transmission and an increment instruction signal based on a clock or a read/write signal or the like. When the block transmission is started, the leading address for its transfer and an enable signal for the commencement of its transfer are transferred to the counter by a CPU and held in the leading address register. Thereafter, the incrementer is activated in response to the increment instruction signal to form a leading address A+1 of the leading address register. Further, addresses are generated and the contents of the leading address register is rewritten. Therefore, RAM addresses are respectively incremented to A, A+1, A+2, . . . in turn as shown in a timing chart of FIG. 22. According to the addresses, data $D_A$, $D_{A+1}$, $D_{A+2}$, . . . are successively written/read.

Since the counter does not accept each address from the address bus after the block transmission is enabled in the present embodiment, the data are properly read out in order even if any value is given to the address bus. Thus, when random numbers B, C, D, E, . . . produced by a random number generator or the like are outputted to the address bus, a current used up by the address bus can be disturbed and a current consumed by the whole chip can be disturbed owing to this effect. It is therefore possible to make it difficult to analyze a chip internal operation.

Figure 23:
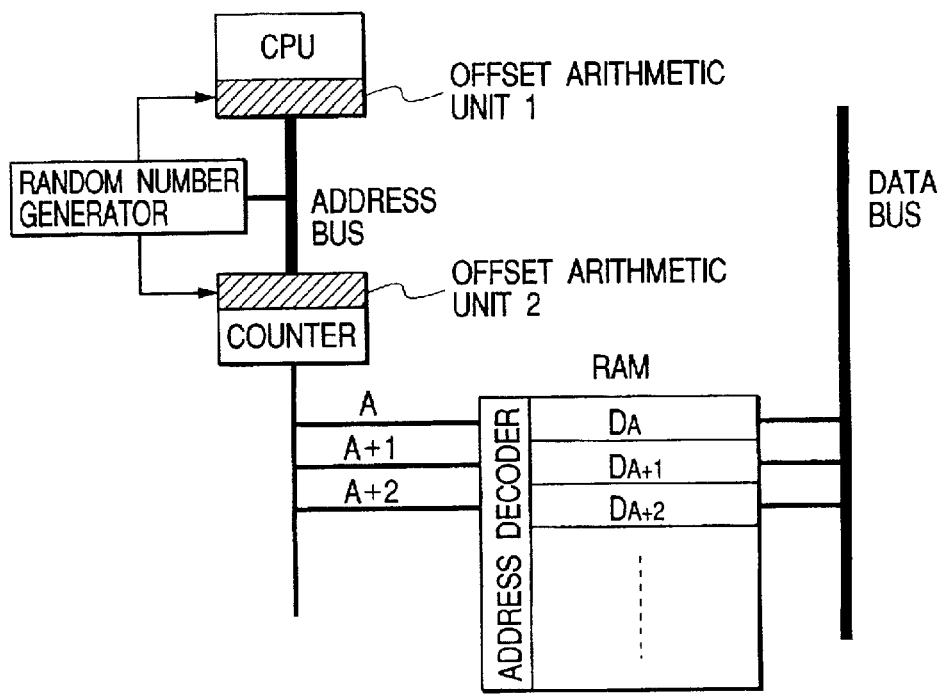
FIG. 23 is a fragmentary block diagram depicting a further embodiment of an IC card chip according to the present invention.

FIG. 23 is a fragmentary block diagram showing a further embodiment of a chip for an IC card according to the present invention. Even in the case of the present embodiment, a memory is provided with a counter upon transfer of data between an encoding processing computing unit and a memory (RAM). However, an address offset function is provided so as to disturb even the initial addresses for such an encoding processing computing unit and memory RAM. That is, each of random numbers produced by a random number generator or the like is simultaneously transferred to a CPU and the counter in advance. Further, a value obtained by adding the random number to the initial address for block transmission or subtracting it therefrom is outputted to an address bus. On the counter side, the value of the address bus is decoded using the same random number to obtain the initial address.

Figure 24:
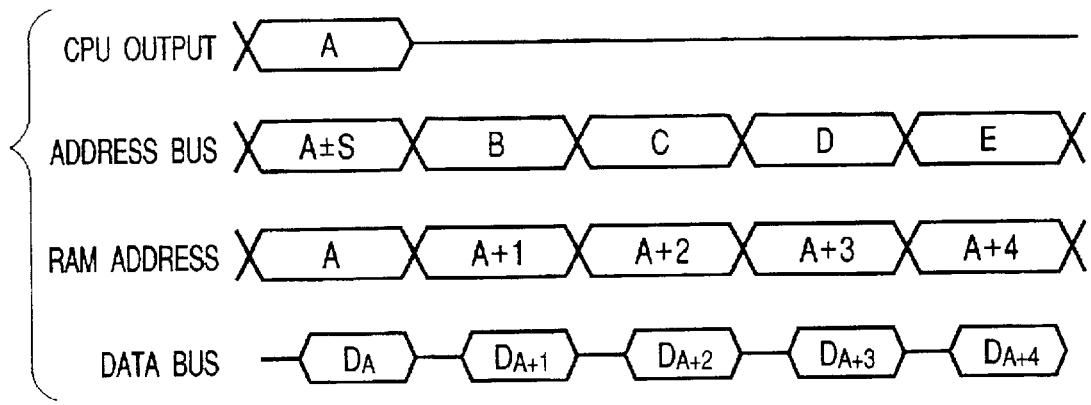
FIG. 24 is a timing chart showing one example of the operation of the IC card chip shown in FIG. 23.

FIG. 24 is a timing chart for describing the transfer operation. Random numbers produced by the random number generator are transferred to the CPU and RAM in advance. An offset arithmetic unit 1 transmits an address A±S obtained by adding a random number S to the initial address A for block transmission or subtracting it therefrom to the address bus. On the counter side, the value of the address bus is decoded using the same random number S to obtain the initial address A from an offset arithmetic unit 2. Subsequently, the address A is incremented to produce addresses A+1, A+2, . . . in the same manner as described above. Since the random number generator sends random numbers B, C, D, . . . to the address bus in synchronism with such addresses A+1 and A+2, a current used up by the address bus can be disturbed inclusive of the leading address, and hence the analysis of a chip internal operation can be rendered more difficult.

When the exponential residue computation "$X^Y$ modN" (where X, Y and N: positive integers) is used in the encoding/decoding device such as described in the aforementioned embodiment, very large numbers normally ranging from about 100 bits to about 2000 bits are used as X, Y and N. Therefore, how to execute "$X^Y$ modN" at high speed becomes important. As one solving method therefor, the following algorithm for executing residue multiplication "$ABR^{-1}$modN" is known. The one of applicants of the present application has proposed a microcomputer disclosed in Japanese Patent Application Laid-Open No. Hei 10(1998)-21057 (U.S. Re. Pat. No. 5,961,578), wherein a sum-of-product arithmetic unit based on the algorithm of "$ABR^{-1}$modN" is used.

The above-described algorithm comprises the following steps (1) through (12).

(1) input X, Y=$e_n$ $e_{n-1}$ . . . $e_1$, N, R
(2) B=$R^2$ modN
(3) A=X
(4) A=$ABR^{-1}$modN+kN
(5) B=A
(6) for i=n−1 or 1 step−1 {
(7) A=$A^2$ $R^{-1}$modN+kN
(8) if $e_i$=1 then A=$ABR^{-1}$modN+kN
(9) }
(10) A=$AR^{-1}$mdoN+kN
(11) A=AmodN
(12) output A In the other embodiment of the present invention, the co-processor 209 shown in FIG. 2 executes "residue multiplication" described "A=$ABR^{-1}$modN+kN", etc. in the steps (4), (7), (8) and (10) of the algorithm 5. This type of co-processor 209 includes an arithmetic circuit and a control circuit, which will be described later. The input values A, B, R and N of the residue multiplication and the output value A are held in a dedicated register or a storage device such as a RAM.

Figure 26:
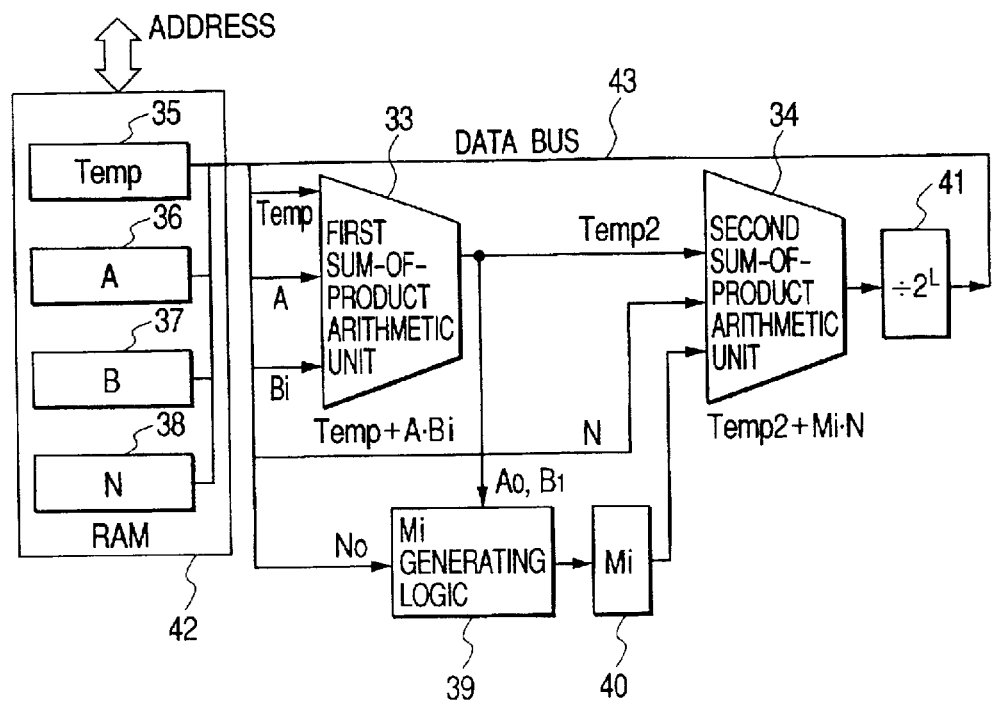
FIG. 26 is a block diagram showing a still further embodiment of a co-processor employed in the present invention.

FIG. 26 is a block diagram of a still further embodiment of a co-processor used in the present invention. In the same drawing, reference numeral 33 indicates a first sum-of-product arithmetic unit, reference numeral 34 indicates a second sum-of-product arithmetic unit, reference numeral 35 indicates a temporary register for holding a temporarily stored value Temp, reference numeral 36 indicates a register used to store a value A therein, reference numeral 37 indicates a register used to store a value B therein, and reference numeral 38 indicates a register used to store a value N therein, respectively. Reference numeral 39 indicates a $M_i$ generating logic, reference numeral 40 indicates a latch for holding a value $M_i$ generated by the $M_i$ generating logic 39, and reference numeral 41 indicates a shift circuit or shifter for performing "$\div 2^L$", respectively.

In the present embodiment, a computation "$(AB_i+M_iN)/2^L$" is executed based on such block division as described in detail in the above publication. First of all, the first sum-of-product arithmetic unit 33 executes a sum-of-product computation "Temp+$A \cdot B_i$" with a value Temp of the register 35, a value A of the register 36 and a value $B_i$ of the register 37 as inputs. The result of its computation is sent to the second sum-of-product arithmetic unit 34 corresponding to the next stage as a value Temp2. The value Temp2 is an integer having an n+L bit length.

On the other hand, the $M_i$ generating logic 39 generates an integer $M_i$ of an L bit with numbers $A_0$, $B_i$ and $N_0$ each having an L bit length as inputs. The integer $M_i$ is temporarily held in the register 40. The second sum-of-product arithmetic unit 34 executes a sum-of-product computation "Temp2+$M_i \cdot N$" with the Temp2, N and $M_i$ as inputs. Low-order L bits in the computational result having an n+L bit length are all 0 and erased by the shifter 41 (i.e., divided by $2^L$). Further, the result of an n bit length is sent to and held in the register 35 as a value Temp.

If the above operation is repeatedly executed n/L times, then a computation "(AB+MN)/R" can be implemented. According to it, it is unnecessary to calculate and hold an integer M of an n bit in advance. Only $M_i$ having an L bit length is determined while the calculation of the sum-of-product arithmetic unit 33 is being executed, and it may be held in the register 40. The time required to calculate a value M can be deleted and the scale of storing means for holding the value M therein can be reduced. Further, the sum-of-product arithmetic unit 33 and the sum-of-product arithmetic unit 34 are connected in series to provide a continuous operation, whereby the need for the specific provision of storing means for temporarily holding an intermediate result Temp2 having an n+L bit length is eliminated.

The registers 35 through 38 are respectively connected to the sum-of-product arithmetic units 33 and 34 through a bus 43. Accordingly, a RAM 42 can constitute the registers 35 through 38. It is thus possible to reduce a register area on a semiconductor chip. Since the amount of data transferred through the data bus 43 increases in particular in such a configuration, the width of the data bus increases and the need for avoiding an increase in the area of the semiconductor chip occurs. However, the series connection of the sum-of-product arithmetic unit 33 and the sum-of-product arithmetic unit 34 as in the embodiment shown in FIG. 26 eliminates for the need for the transfer of the intermediate result Temp2 through the use of the data bus, whereby the amount of data transmitted through the bus can be reduced.

Owing to the non-execution of the operations of Temp=0 by the first sum-of-product arithmetic unit 33, $M_i \cdot N$=0 by the second sum-of-product arithmetic unit 34 and "$\div 2^L$" by the selector 41 in the co-processor according to the present embodiment, the computing means shown in the same drawing can be used as a circuit for executing a multiple-length multiplication (corresponding to a multiplication of a small number $B_i$ and a large number A equivalent to its multiple length) like "$A \cdot B_i$". The multiple-length multiplying computation like "$A \cdot B_i$" is applied when the computation "$R^2$ modN" of the step (2) in the above algorithm is executed using the microprocessor 201. Thus, such a computation can be speeded up.

Figure 27:
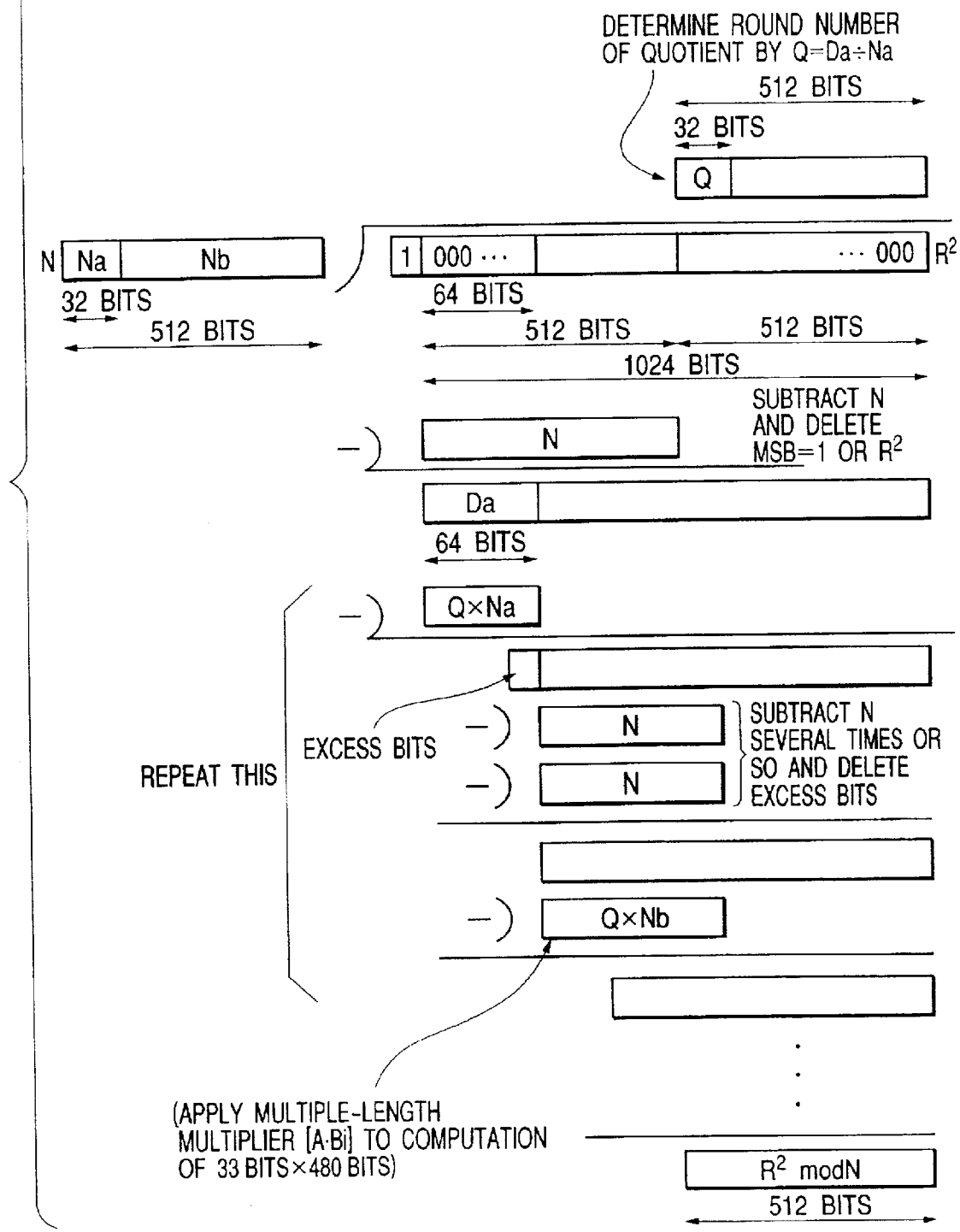
FIG. 27 is a conceptual diagram illustrating a method of calculating "$R^2$ modN" employed in the present invention.

As shown in a conceptual diagram of the calculation of "$R^2$ modN" in FIG. 27, $R=2^n$ and n=512. Further, N is set to 512 bits and $R^2$ is set so that only the most significant bit is 1 and all of 1024 bits on the low-order side become a value of 0. When the computation "$R^2$ modN" is executed by a microprocessor, the direct division of a large number $R^2$ by a large number N in the same manner is inefficient. Therefore, each dividend is grasped or recognized as a block represented in a 64-bit unit as viewed from the most significant or top side. Further, each divisor is grasped as a block represented in a 32-bit unit as viewed from the most significant side. Blocks on the rightmost or high-order side are successively subjected to division as objects, and each of the resultant values is grasped as a rough number of a quotient.

In the same drawing, for example, Q (=Da÷Na) is grasped as a rough number of a quotient. Described schematically, "Q·Na" is subtracted from the upper-order side of $R^2$, and "Q·Nb" is subtracted from the upper-order side of the result of its subtraction. The result of "$R^2$ modN" can be obtained by a method of effecting a process similar to above on the result of subtraction of "Q·Nb" and repeating the similar process with respect to the result of its process.

Actually, a subtracting process for erasing surplus bits is interposed in the course of the above procedure. At this time, the process for the computation "Q·Nb" is regarded as a multiplying process of large numbers like 32 bits and 480 bits in the first time. However, the multiplying process of such large numbers is repeated any number of times. If, at this time, the multiple-length multiplying computation like "$A \cdot B_i$" computable by the co-processor shown in FIG. 26 is used, in other words, the co-processor is burdened with such a multiple-length multiplying computation, then the process of computing "$R^2$ modN" can be speeded up when the computation "$R^2$ modN" of step 2 in the algorithm 5 is executed by using the microprocessor 201.

As described in detail in the Publication (Japanese Patent Application Laid-Open No. Hei 10(1998)-21057), the computing process of "$A=ABR^{-1}$modN" in the above algorithm is one for subtracting N from the computational result W, i.e., performing a subtraction of W−N in the presence of an overflow upon a residue multiplication. Therefore, a difference occurs between a computing time and current consumption according to the presence or absence of the overflow. Therefore, there is a possibility that one will observe a current consumed by the above-described IC card LSI and analyze an in-chip operation from its timing and the result of statistical processing.

Figure 28:
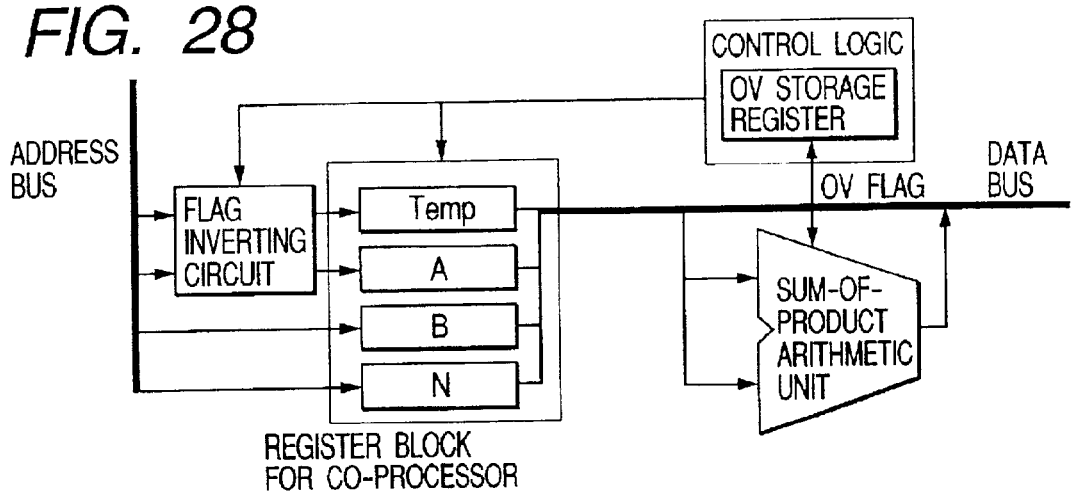
FIG. 28 is a fragmentary block diagram depicting one embodiment of an encoding processing computing unit according to the present invention.

FIG. 28 is a fragmentary block diagram of one embodiment of an encoding processing computing unit according to the present invention. The encoding processing computing unit according to the present embodiment is included in a co-processor included in the one-chip microcomputer mounted to the IC card or the like described above.

Referring to FIG. 28, the $A^2R^{-1}$modN or $ABR^{-1}$modN are computed by a sum-of-product arithmetic unit or device including the first and second arithmetic units 33 and 34 shown in FIG. 26. The result of its computation W is stored in a temporary register Temp. When an overflow is developed in the result of computation, an overflow flag OV delivered from the arithmetic unit is stored in an OV storage register of a control logic. Subsequently, the subtraction of the computational result W−N stored in the temporary register Temp is done after the residue multiplication.

When the overflow flag OV exists (logical 1), the result of the subtraction W−N is stored in the temporary register Temp. When no overflow flag OV exists (logical 0), the result of the subtraction W−N is not stored in the temporary register Temp but is stored in a suitable storage circuit other than the temporary register Temp, e.g., a register A. That is, the operation of storing the subtraction W−N and invalid data formed according to it in the suitable storage circuit is defined as the disturbance-aimed operation. Thus, even when no overflow occurs in the residue multiplication, an operating current flowing in an IC card in association with the storage of the subtraction of W−N and the result of its computation in the register is always developed, whereby the external identification of the presence or absence of the overflow can be rendered difficult.

The above-described signal processing is executed according to the following program.

W←(AB+MN)/R
Store OV bit
if OV then
W←W−N (normal overflow processing and writing into W)
Else
A←W−N (overflow processing for disturbance and writing into A)
Exchange W and A
Output A In the program referred to above, W indicates a temporary register and its data. When no overflow flag OV exists, each address of the temporary register Temp is replaced by its corresponding address of the register A, whereby data of W or A is outputted as valid data in association with the presence/absence of the overflow flag OV. In the present embodiment, the address exchange like Exchange W and A is carried out to thereby output data in the temporary register (W) according to addressing of the register A.

The above-described signal processing can be replaced by the following program.

W←(AB+MN)/R
Store OV bit
A←W−N (overflow processing and writing into A)
f! OV then
Exchange W and A
Else nop
Output A That is, if no overflow flag OV exists after a subtraction W−N for performing the overflow processing with respect to the presence or absence of the overflow flag OV without condition, and the result of its subtraction are written into the register A, then the address exchange like Exchange W and A is done to thereby output the data of the temporary register (W) according to the addressing of the register A. If not, then the data W−N of the register A is outputted as valid data without the address exchange.

The above-described signal processing can further be replaced by the following program.

W←(AB+NM)/R
Store OV bit
Exchange W and A
W←A−N (overflow processing and writing into A)
if OV then
Exchange W and A
Else nop
Output A That is, the address exchange like Exchange W and A is carried out before the execution of a subtraction W−A for performing the overflow processing with respect to the presence or absence of the overflow flag OV to perform a subtraction of A−N, i.e., a subtraction of W−N, thereby allowing the temporary register (W), i.e., register A to output data. If the overflow flag OV exists, then the address exchange like Exchange W and A is carried out again to output the data of the register A according to the addressing of the register A. If no overflow flag OV exists, then the data of the temporary register (W) is outputted according to the addressing of the register A while the address exchange is kept intact as described above. In this configuration, a logic circuit for performing the writing of data into the register apparently takes such a configuration as to write data into the temporary register (W). Thus, logic for writing the data into the register A becomes unnecessary, thereby allowing circuit simplification.

The exchange of each address between the temporary register Temp and the register A can be implemented by a flag inverting circuit. That is, for example, one bits like the least significant bits, of address signals supplied from the address bus are set so as to differ from each other between the temporary register Temp and the register A, and such bits are simply selectively exchanged by the flag inverting circuit. Thus, the register A can be selected according to the designation of an address assigned to the temporary register Temp. The temporary register Temp can be selected according to an address assigned to the register A in reverse.

In the embodiment shown in FIG. 28, the two registers Temp and A are used and the valid data is always stored in one (e.g., temporary register Temp) thereof in association with the overflow flag OV. The above address exchange is done to thereby allow the one thereof to output valid data according to an address for specifying the register A. The operation of storing the subtraction W−N and invalid data formed according to it in a suitable storage circuit is defined as a disturbance-aimed operation. Thus, even when no overflow occurs in the residue multiplication, an operating current flowing in an IC card in association with the storage of the subtraction of W−N and the result of its computation in the register is always developed, whereby the external identification of the presence or absence of the overflow can be rendered difficult.

A borrow (Borrow) flag BR may be used in place of the overflow flag employed in the sum-of-product arithmetic unit as in the embodiment. That is, the result W of computation of $A^2R^{-1}modN$ or $ABR^{-1}modN$ is stored in the temporary register Temp, which stores a borrow flag BR sent from the arithmetic unit at the execution of the subtraction of W−N. An address is exchanged between the temporary register Temp and the register A only when the borrow flag BR exists. Finally, valid data may be read according to the addressing of the register A.

The above-described signal processing can be implemented by the following program.

W←(AB+NM)/R
A←W−N
Store BR bit
if BR then
Exchange W and A
Else nop
Output A

Figure 29:
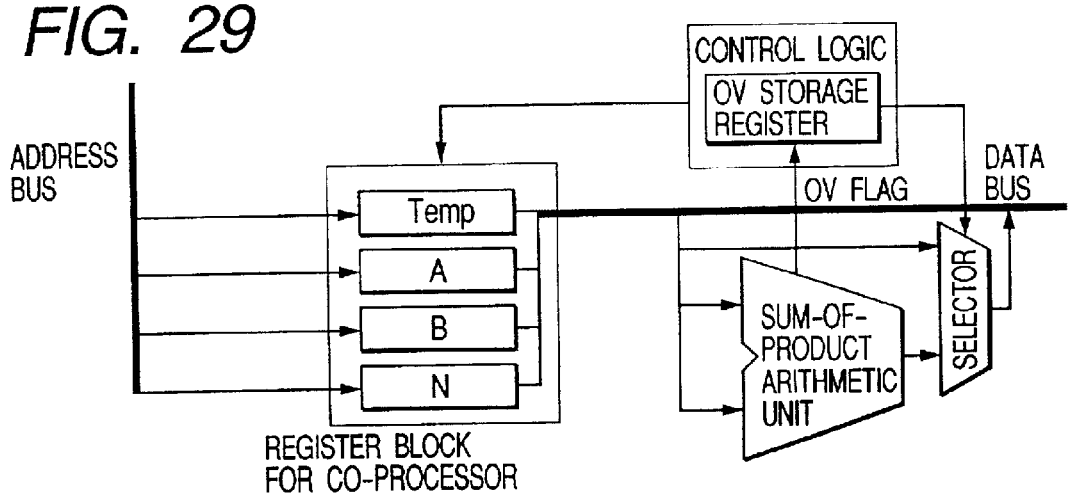
FIG. 29 is a fragmentary block diagram illustrating another embodiment of an encoding processing computing unit according to the present invention.

FIG. 29 is a fragmentary block diagram of another embodiment of an encoding processing computing unit according to the present invention. The encoding processing computing unit according to the present embodiment is also included in a co-processor included in a one-chip microcomputer mounted on the IC card or the like. In the present embodiment, a selector is provided which outputs either one of a signal of a data bus and the output of the sum-of-product arithmetic unit in accordance with an overflow flag OV stored in such an OV flag storage register as described above.

The subtraction of W−N is carried out after the residue multiplication. The result of its subtraction W−N and the value of W read onto the data bus for computation are inputted to the selector. When the overflow flag OV exists, the subtraction result W−N is selected. When no overflow flag OV exists, the value of W on the data bus is selected. Further, the selected value is stored in a register A, and A is outputted as finally valid data, whereby an operating current flowing in the IC card or microcomputer in association with the storage of the subtraction of W−N and the writing of data in the register is always developed and hence the external identification of the presence or absence of an overflow can be rendered difficult.

Figure 30:
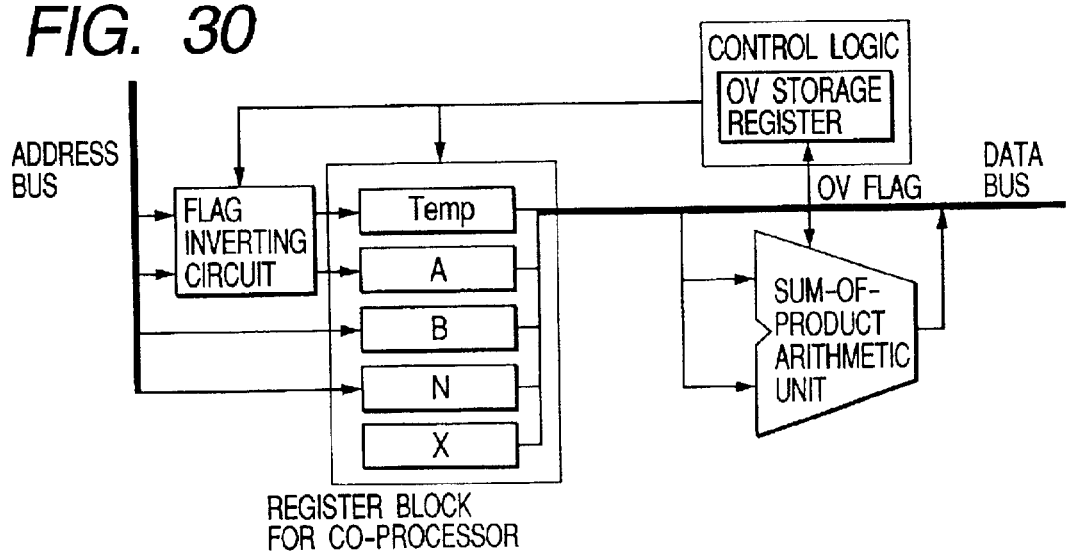
FIG. 30 is a fragmentary block diagram showing a further embodiment of an encoding processing computing unit according to the present invention.

FIG. 30 is a fragmentary block diagram of a further embodiment of an encoding processing computing unit according to the present invention. In the present embodiment, a register X is added to the register block in the embodiment shown in FIG. 28. The subtraction of W−N is carried out after the completion of a residue multiplication in the same manner as described above. When an overflow flag OV exists, the result of computation W−N is written into a register A. When no overflow flag OV exists, the subtraction of W−N is written into a register X dedicated for a disturbance computation. Thereafter, when no overflow flag OV exists, an address is exchanged between a temporary register (W) and the register A, and valid data is finally outputted according to an address for selecting the register A.

The above-described signal processing can be realized by the following program.

W←(AB+MN)/R
Store OV bit
if OV then
   A→W−N (normal overflow processing and writing into A)
Else
   X←W−N (overflow processing for disturbance and writing into X)
Exchange W and A
Output A Operations and effects obtained from the above embodiments are as follows:

(1) An advantageous effect is obtained in that in an IC card supplied with an operating voltage by an electrical connection between each of external terminals and a read/write device, and including an input-output operation of data with an encoding process or a decoding process, a disturbance-aimed processing operation similar to an original processing operation is included in the encoding process or decoding process to uniformalize timings provided to operate an internal circuit and its operating current, thereby making it possible to render decoding using each of current waveforms difficult.

(2) In addition to the above, an advantageous effect is obtained in that an exponential residue multiplying operation applicable to RSA cryptography or the like is included in the encoding process or the decoding process, thereby making it possible to obtain an IC card which has realized the strengthening of security protection.

(3) In addition to the above, an advantageous effect is obtained in that the exponential residue multiplying operation is carried out by an encoding processing computing unit operated in response to instructions given from a central processing unit, thereby making it possible to perform a high-speed data process.

(4) In addition to the above, an advantageous effect is obtained in that the encoding processing computing unit is activated in such a manner that in response to X, Y and N inputted thereto, $A=A^2 \bmod N$ and $A=AB \bmod N$ are alternately computed with $A=1$ and $B=X$, and if a bit is logical 0 as viewed bit by bit from a high order of Y upon such a computation, then the computational result of $A^2 \bmod N$ is taken in a storage circuit as valid data, whereas if it is a logical 1, then the computational results of $A^2 \bmod N$ and $AB \bmod N$ are taken in a storage circuit as valid data, and that when the bit is given as the logical 0, the operation of computing A $AB \bmod N$ is set as the disturbance-aimed processing operation, whereby decoding using each current waveform while encoding is being carried out, can be rendered difficult.

(5) In addition to the above, an advantageous effect is obtained in that a register block comprised of a plurality of registers each of which performs the input/output of data through a read/write buffer, is used as the storage circuit to thereby control a gate circuit according to a logical 1 or 0 of a specific bit $e_i$ of the Y, and control the transmission of a write strobe signal supplied to a predetermined register, thereby allowing the predetermined register to store only valid data of the computational result through the read/write buffer, whereby decoding using each current waveform while encoding is being carried out, can be made difficult.

(6) In addition to the above, an advantageous effect is obtained in that a register block comprised of a plurality of registers each of which performs the input/output of data through a read/write buffer, is used as the storage circuit to thereby control a gate circuit according to a logical 1 or 0 of a specific bit $e_i$ of the Y, and control the transmission of a write strobe signal supplied to the read/write buffer, thereby allowing the predetermined register to store only valid data of the computational result through the read/write buffer, whereby decoding using each current waveform while encoding is being carried out, can be rendered difficult.

(7) In addition to the above, an advantageous effect is obtained in that a register block comprising a plurality of registers each of which performs the input/output of data through a read/write buffer, and a disturbance register, is used as the storage circuit, a selector is provided between the read/write buffer and the disturbance register and plural registers so as to be controlled according to a logical 1 or 0 of a specific bit $e_i$ of the Y, thereby allowing a predetermined register to store valid data of a computational result written into the read/write buffer and allowing the disturbance register to store invalid data, whereby decoding using each current waveform while encoding is being carried out, can be rendered more difficult.

(8) In addition to the above, an advantageous effect is obtained in that the encoding processing computing unit is activated in such a manner that in response to X, Y and N inputted thereto, $A=A^2 \bmod N$ and $A=AB \bmod N$ are alternately computed with $A=1$ and $B=X$, and if a bit is logical 0 as viewed bit by bit from a high order of Y upon such a computation, then the computational result of $A^2 \bmod N$ is taken in a storage circuit as valid data with its output timing, whereas if it is a logical 1, then the computational results of $A^2 \bmod N$ and $AB \bmod N$ are taken in a storage circuit as valid data with its output timing, and the encoding processing computing unit continues the operation of $A=A^2 \bmod N$ even during a period from the output of the computational result of $A=A^2 \bmod N$ to the commencement of the computation of $A=AB \bmod N$, and continues the operation of $A=AB \bmod N$ even during a period from the output of the computational result of $A=AB \bmod N$ to the commencement of the computation of $A^2$ modN corresponding to the next bit inclusive of a change determining process of each bit of the Y, whereby decoding using each current waveform while encoding is being carried out, can be made more difficult.

(9) In addition to the above, an advantageous effect is obtained in that the encoding processing computing unit is activated in such a manner that in response to X, Y and N inputted thereto, $A=A^2$ modN and A=ABmodN are computed and overflow-computed with A=1 and B=X, and if a bit is logical 0 as viewed bit by bit from a high order of Y upon such computations, then the computational result of $A^2$ modN is taken in a storage circuit as valid data, whereas if it is a logical 1, then the computational results of $A^2$ modN and ABmodN are taken in a storage circuit as valid data, and that a computing operation of A=ABmodN at the logical 0 and an overflow computation unnecessary for each computing operation are defined as the disturbance-aimed processing operations, whereby decoding using each current waveform while encoding is being carried out, can be rendered more difficult.

(10) An advantageous effect is obtained in that in an IC card which is supplied with an operating voltage by an electrical connection between each of external terminals and a read/write device, and which performs the input/output of data with an encoding process or a decoding process, a disturbance-aimed computation is included in the encoding process or decoding process to allow timings provided to operate an internal circuit and its operating current to have irregularities, thereby making it possible to render decoding using each of current waveforms more difficult.

(11) An advantageous effect is obtained in that in an IC card which is supplied with an operating voltage by an electrical connection between each of external terminals and a read/write device, and which performs the input/output of data with an encoding process or a decoding process, disturbance-aimed cycles are included in intervals for respective computations in the encoding process or decoding process to allow timings provided to operate an internal circuit and its operating current to have irregularities, whereby decoding using each current waveform while encoding is being carried out, can be made more difficult.

(12) An advantageous effect is obtained in that in a microcomputer having a module configuration including an input-output operation of data with an encoding process or a decoding process, a disturbance-aimed processing operation is included in the encoding process or decoding process to uniformalize timings provided to operate an internal circuit and its operating current, whereby decoding using each current waveform with respect to the moduled microcomputer can be made difficult.

(13) In addition to the above, an advantageous effect is obtained in that the module configuration of the microcomputer is formed on one semiconductor substrate, thereby making it possible to prevent even direct decoding of programs or data or the like other than each current waveform while a size reduction thereof is being achieved.

(14) In addition to the above, an advantageous effect is obtained in that the encoding process or decoding process of the microcomputer includes an exponential residue multiplying operation applicable to RSA cryptography or the like, and the exponential residue multiplying operation is executed by an encoding processing computing unit operated in response to instructions given from a central processing unit, whereby a high-speed encoding processing operation can be carried out.

(15) In addition to the above, an advantageous effect is obtained in that the encoding processing computing unit of the microcomputer is activated in such a manner that in response to X, Y and N inputted thereto, $A=A^2$ modN and A=ABmodN are computed with A=1 and B=X, and if a bit is logical 0 as viewed bit by bit from a high order of Y upon such a computation, then the computational result of $A^2$ modN is taken in a storage circuit as valid data, whereas if it is a logical 1, then the computational results of $A^2$ modN and ABmodN are taken in a storage circuit as valid data, and that when the bit is given as the logical 0, the operation of computing A=ABmodN is set as the disturbance-aimed processing operation, whereby decoding using each current waveform while encoding is being carried out, can be rendered difficult.

(16) In addition to the above, an advantageous effect is obtained in that the encoding processing computing unit of the microcomputer is activated in such a manner that in response to X, Y and N inputted thereto, $A=A^2$ modN and A=ABmodN are computed with A=1 and B=X, and if a bit is logical 0 as viewed bit by bit from a high order of Y upon such a computation, then the computational result of $A^2$ modN is taken in a storage circuit as valid data with its output timing, whereas if it is a logical 1, then the computational results of $A^2$ modN and ABmodN are taken in a storage circuit as valid data with its output timing, and the encoding processing computing unit continues the operation of $A=A^2$ modN even during a period from the output of the computational result of $A=A^2$ modN to the commencement of the computation of A=ABmodN, and continues the operation of A=ABmodN even during a period from the output of the computational result of A=ABmodN to the commencement of the computation of $A^2$ modN corresponding to the next bit inclusive of a change determining process of each bit of the Y, whereby decoding using each current waveform while encoding is being carried out, can be made difficult.

(17) In addition to the above, an advantageous effect is obtained in that the encoding processing computing unit of the microcomputer is activated in such a manner that in response to X, Y and N inputted thereto, $A=A^2$ modN and A=ABmodN are computed and overflow-computed with A=1 and B=X, and if a bit is logical 0 as viewed bit by bit from a high order of Y upon such computations, then the computational result of $A^2$ modN is taken in a storage circuit as valid data, whereas if it is a logical 1, then the computational results of $A^2$ modN and ABmodN are taken in a storage circuit as valid data, and that a computing operation of A=ABmodN at the logical 0 and an overflow computation unnecessary for each computing operation are defined as the disturbance-aimed processing operations, whereby decoding using each current waveform while encoding is being carried out, can be rendered difficult.

(18) In addition to the above, an advantageous effect is obtained in that the encoding processing computing unit computes $A=A^2R^{-1}$modN and $A=ABR^{-1}$modN according to the value of each bit of Y with A=1 and B=X in response to X, Y and N inputted thereto, and performs a normal operation for performing the subtraction W−N of N from the computational result W when an overflow occurs in each computational result, and a disturbance-aimed operation for generating invalid data, based on a computation corresponding to the subtraction W−N even when no overflow occurs in each individual computational results, thereby outputting valid data according to the presence or absence of the overflow, whereby decoding using each current waveform can be rendered difficult while the encoding processing computing unit is being simplified and speeded up.

(19) In addition to the above, an advantageous effect is obtained in that the computational result W of $A^2R^{-1}$modN or $ABR^{-1}modN$ is stored in a first storage circuit, the presence or absence of an overflow flag OV of an arithmetic unit is stored, the subtraction W−N of N from the computational result W stored in the first storage circuit is carried out after the residue multiplication, the result of computation thereof is stored in the first storage circuit when the overflow flag OV exists, the result of computation thereof is stored in a second storage circuit different from the first storage circuit as the disturbance-aimed operation when no overflow flag OV exists, and the computational result of the first storage circuit is outputted as valid data, whereby decoding using each current waveform can be made difficult while the simplification and speeding up of the encoding processing computing unit are being carried out.

(20) In addition to the above, an advantageous effect is obtained in that the computational result W of $A^2R^{-1}modN$ or $ABR^{-1}modN$ is stored in a first storage circuit, the presence or absence of an overflow flag OV of an arithmetic unit is stored, the subtraction W−N of N from the computational result W stored in the first storage circuit is carried out after the residue multiplication, and the computational result W−N is selected by a selector when the overflow flag OV exists, whereas when no overflow flag OV exists, the computational result W of the first storage circuit is selected by the selector and stored in a second storage circuit, whereby decoding using each current waveform can be rendered difficult while the simplification and speeding up of the encoding processing computing unit is being carried out.

(21) In addition to the above, an advantageous effect is obtained in that the computational result W of $A^2R^{-1}modN$ or $ABR^{-1}modN$ is stored in a first storage circuit, the presence or absence of an overflow flag OV of an arithmetic unit is stored, the subtraction W−N of N from the computational result W stored in the first storage circuit is carried out after the residue multiplication, and when the overflow flag OV exists, the subtraction W−N is stored in a second storage circuit, when no overflow flag OV exists, the subtraction W−N is stored in a third storage circuit, when the overflow flag OV exists, the data stored in the second storage circuit is outputted as valid data, and when no overflow flag OV exists, the data stored in the first storage circuit is outputted as valid data, whereby decoding using each current waveform can be rendered difficult while the simplification and speeding up of the encoding processing computing unit is being carried out.

(22) In addition to the above, an advantageous effect is obtained in that the computational result W of $A^2R^{-1}modN$ or $ABR^{-1}modN$ is stored in a first storage circuit, the presence or absence of an overflow flag OV of an arithmetic unit is stored, the subtraction W−N of N from the computational result W stored in the first storage circuit is stored in a second storage circuit after the residue multiplication, when no overflow flag OV exists, the least significant addresses for selecting the first storage circuit and the second storage circuit are reversed and the first storage circuit is selected according to the address for selecting the second storage circuit to output the computational result as valid data, and when the overflow flag OV exists, the least significant addresses for selecting the first storage circuit and the second storage circuit are held as they are and the computational result of the second storage circuit is outputted as valid data, whereby decoding using each current waveform can be rendered difficult while the simplification and speeding up of write logic into a register are being carried out in addition to the simplification of the encoding processing computing unit.

(23) In addition to the above, an advantageous effect is obtained in that the computational result W of $A^2R^{-1}modN$ or $ABR^{-1}modN$ is stored in a first storage circuit, the presence or absence of an overflow flag OV of an arithmetic unit is stored, addresses for the first storage circuit and the second storage circuit are exchanged after the residue multiplication, the subtraction W−N of N from a computational result W selected according to an address for selecting the second storage circuit is performed, and the subtraction result W−N is stored in the second storage circuit selected according to an address for selecting the first storage circuit, and only when the overflow flag OV exists, the addresses are exchanged again and data stored in the first or second storage circuit selected according to the address for selecting the second storage circuit is outputted as valid data, whereby decoding using each current waveform can be rendered difficult while the simplification and speeding up of write logic into a register are being carried out in addition to the simplification of the encoding processing computing unit.

(24) In addition to the above, an advantageous effect is obtained in that the computational result W of $A^2R^{-1}modN$ or $ABR^{-1}modN$ is stored in a first storage circuit, the subtraction W−N of N from the computational result W of the first storage circuit is carried out after the residue multiplication and stored in a second storage circuit, a borrow flag BR of an arithmetic unit at the subtraction of W−N is stored, and when the borrow flag BR exists, the least significant addresses for selecting the first storage circuit and the second storage circuit are reversed and the computational result W of the first storage circuit is outputted according to an address for selecting the second storage circuit, whereas when no borrow flag BR exists, the least significant addresses for selecting the first storage circuit and the second storage circuit are held as they are and the computational result W−N of the second storage circuit is outputted according to the address for selecting the second storage circuit, whereby decoding using each current waveform can be rendered difficult while the simplification and speeding up of write logic into a register are being carried out in addition to the simplification of the encoding processing computing unit.

(25) In addition to the above, an advantageous effect is obtained in that the encoding processing computing unit of the microcomputer computes $A=A^2R^{-1}modN$ and $A=ABR^{-1}modN$ according to the value of each bit of Y with A=1 and B=X in response to X, Y and N inputted thereto, and performs a normal operation for performing the subtraction W−N of N from the computational result W when an overflow occurs in each computational result, and a disturbance-aimed operation for generating invalid data, based on a computation corresponding to the subtraction W−N even when no overflow occurs in each individual computational results, thereby outputting valid data according to the presence or absence of the overflow, whereby decoding using each current waveform can be rendered difficult while the simplification and speeding up of write logic into a register are being carried out in addition to the simplification of the encoding processing computing unit.

(26) In addition to the above, an advantageous effect is obtained in that in the encoding processing computing unit of the microcomputer, the computational result W of $A^2R^{-1}modN$ or $ABR^{-1}modN$ is stored in a first storage circuit, the presence or absence of an overflow flag OV from an arithmetic unit is stored, the subtraction W−N of N from the computational result W stored in the first storage circuit is carried out after the residue multiplication, the result of computation thereof is stored in the first storage circuit when the overflow flag OV exists, the result of computation thereof is written into a second storage circuit different from the first storage circuit as the confusion-aimed operation when no overflow flag OV exists, and the computational result of the first storage circuit is outputted as valid data, whereby decoding using each current waveform can be made difficult while the simplification and speeding up of the encoding processing computing unit are being carried out.

(27) In addition to the above, an advantageous effect is obtained in that in the encoding processing computing unit of the microcomputer, the computational result W of $A^2R^{-1}modN$ or $ABR^{-1}modN$ is stored in a first storage circuit, the presence or absence of an overflow flag OV of an arithmetic unit is stored, the subtraction W−N of N from the computational result W stored in the first storage circuit is carried out after the residue multiplication, and the computational result W−N is selected by a selector when the overflow flag OV exists, whereas when no overflow flag OV exists, the computational result W of the first storage circuit is selected by the selector and stored in a second storage circuit, and the computational result W is outputted as valid data, whereby decoding using each current waveform can be rendered difficult while the simplification and speeding up of the encoding processing computing unit is being carried out.

(28) In addition to the above, an advantageous effect is obtained in that in the encoding processing computing unit of the microcomputer, the computational result W of $A^2R^{-1}modN$ or $ABR^{-1}modN$ is stored in a first storage circuit, the presence or absence of an overflow flag OV of an arithmetic unit is stored, the subtraction W−N of N from the computational result W stored in the first storage circuit is carried out after the residue multiplication, and when the overflow flag OV exists, the subtraction result W−N is stored in a second storage circuit, when no overflow flag OV exists, the subtraction result W−N is stored in a third storage circuit, when the overflow flag OV exists, the data stored in the second storage circuit is outputted as valid data, and when no overflow flag OV exists, the data stored in the first storage circuit is outputted as valid data, whereby decoding using each current waveform can be rendered difficult while the simplification and speeding up of the encoding processing computing unit is being carried out.

(29) In addition to the above, an advantageous effect is obtained in that in the encoding processing computing unit of the microcomputer, the computational result W of $A^2R^{-1}modN$ or $ABR^{-1}modN$ is stored in a first storage circuit, the presence or absence of an overflow flag OV of an arithmetic unit is stored, the subtraction W−N of N from the computational result W stored in the first storage circuit is stored in a second storage circuit after the residue multiplication, when no overflow flag OV exists, the least significant addresses for selecting the first storage circuit and the second storage circuit are reversed and the first storage circuit is selected according to the address for selecting the second storage circuit to output the computational result as valid data, and when the overflow flag OV exists, the least significant addresses for selecting the first storage circuit and the second storage circuit are held as they are and the computational result of the second storage circuit is outputted as valid data, whereby decoding using each current waveform can be rendered difficult while the simplification and speeding up of write logic into a register are being carried out in addition to the simplification of the encoding processing computing unit.

(30) In addition to the above, an advantageous effect is obtained in that in the encoding processing computing unit of the microcomputer, the computational result W of $A^2R^{-1}modN$ or $ABR^{-1}modN$ is stored in a first storage circuit, the presence or absence of an overflow flag OV of an arithmetic unit is stored, addresses for the first storage circuit and the second storage circuit are exchanged after the residue multiplication, the subtraction W−N of N from a computational result W selected according to an address for selecting the second storage circuit is performed, and the subtraction result W−N is stored in the second storage circuit selected according to an address for selecting the first storage circuit, and only when the overflow flag OV exists, the addresses are exchanged again and data stored in the first or second storage circuit selected according to the address for selecting the second storage circuit is outputted as valid data, whereby decoding using each current waveform can be rendered difficult while the simplification and speeding up of write logic into a register are being carried out in addition to the simplification of the encoding processing computing unit.

(31) In addition to the above, an advantageous effect is obtained in that in the encoding processing computing unit of the microcomputer, the computational result W of $A^2R^{-1}modN$ or $ABR^{-1}modN$ is stored in a first storage circuit, the subtraction W−N of N from the computational result W of the first storage circuit is carried out after the residue multiplication and stored in a second storage circuit, a borrow flag BR from an arithmetic unit at the subtraction of W−N is stored, and when the borrow flag BR exists, the least significant addresses for selecting the first storage circuit and the second storage circuit are reversed and the computational result W of the first storage circuit is outputted according to an address for selecting the second storage circuit, whereas when no borrow flag BR exists, the least significant addresses for selecting the first storage circuit and the second storage circuit are held as they are and the computational result W−N of the second storage circuit is outputted according to the address for selecting the second storage circuit, whereby decoding using each current waveform can be rendered difficult while the simplification and speeding up of write logic into a register are being carried out in addition to the simplification of the encoding processing computing unit.

(32) An effect is obtained in that in an IC card supplied with an operating voltage by an electrical connection between each of external terminals and a read/write device, and including an input-output operation of data with an encoding process or a decoding process based on an encoding processing computing unit operated in response to instructions given from a central processing unit, the encoding processing computing unit is provided with each of registers, which stores data used for a computation for the encoding process or decoding process in plural bit units, and data necessary prior to the encoding process or the decoding process is taken in such a register, whereby the need for the transfer of data in the process of a computing operation can be eliminated, thus making it possible to neutralize or invalidate operation analysis at each current waveform.

(33) In addition to the above, an effect is obtained in that the encoding process or decoding process includes an exponential residue multiplying operation applicable to RSA cryptography or the like, and the encoding processing computing unit alternately computes $A=A^2$ modN and A=ABmodN with A=1 and B=X in response to X, Y and N inputted thereto, computes $A=A^2$ modN corresponding to plural bits as viewed by plural bits from a high order of Y upon such computation, and brings the value of B necessary for the computation of ABmodN from the register in association with combinations of the plural bits, whereby the speeding up and security of an encoding process can be realized.

(34) An effect is obtained in that in an IC card supplied with an operating voltage by an electrical connection between each of external terminals and a read/write device, and including an input-output operation of data with an encoding process or a decoding process based on an encoding processing computing unit operated in response to instructions given from a central processing unit, the encoding processing computing unit is provided with a signal path for capturing data used for the next computation from a storage circuit concurrently with a computing operation for the encoding process or decoding process, whereby the computing operation and data transfer can be carried out simultaneously and hence an attack using each current waveform can be invalidated while the register is being simplified.

(35) In addition to the above, an effect is obtained in that the encoding process or decoding process includes an exponential residue multiplying operation applicable to RSA cryptography or the like, and the encoding processing computing unit alternately computes $A=A^2$ modN and $A=AB$modN with $A=1$ and $B=X$ in response to X, Y and N inputted thereto, computes $A=A^2$ modN corresponding to plural bits as viewed by plural bits from a high order of Y upon such computation, and brings the value of B necessary for the computation of ABmodN corresponding to combinations of the plural bits from the storage circuit concurrently with such computation, whereby the speeding up and security of an encoding process can be realized.

(36) An effect is obtained in that in an IC card, which is supplied with an operating voltage by an electrical connection between each of external terminals and a read/write device, in which a central processing unit, a storage circuit, an encoding processing computing unit and a random number generator are connected to a common address bus, and which includes an input-output operation of data with an encoding process or a decoding process based on the encoding processing computing unit and the storage circuit operated in response to instructions given from the central processing unit, data for the encoding process or decoding process, which is supplied from the storage circuit to the encoding processing computing unit is data-transferred to the encoding processing computing unit based on an address signal formed based on a leading address supplied to an address generating circuit built in the storage circuit from the central processing unit, and each of random numbers produced by the random number generator is transmitted to an address bus commonly connected with the central processing unit, storage circuit and encoding processing computing unit as a pseudo address signal in association with the data transfer, whereby a current waveform about data transferred based on the pseudo address signal can be disturbed, thus making it possible to invalidate an attack using each current waveform while the simplification of a register is being carried out.

(37) In addition to the above, an effect is obtained in that the encoding process or decoding process includes an exponential residue multiplying operation applicable to RSA cryptography or the like, and the encoding processing computing unit alternately computes $A=A^2$ modN and $A=AB$modN with $A=1$ and $B=X$ in response to X, Y and N inputted thereto, computes $A=A^2$ modN corresponding to plural bits as viewed by plural bits from a high order of Y upon such computation, and brings the value of B necessary for the computation of ABmodN from the storage circuit in association with combinations of the plural bits, whereby the speeding up and security of an encoding process can be realized.

(38) An effect is obtained in that in an IC card, which is supplied with an operating voltage by an electrical connection between each of external terminals and a read/write device, in which a central processing unit, a storage circuit, an encoding processing computing unit and a random number generator are connected to a common address bus, and which includes an input-output operation of data with an encoding process or a decoding process based on the encoding processing computing unit and the storage circuit operated in response to instructions given from the central processing unit, an encoded address signal formed by the central processing unit through the use of each of random numbers produced from the random number generator is supplied to the storage circuit, which in turn decodes the address signal by using the random number to generate a leading address, thereby reading data for the encoding process or decoding process, followed by transfer to the encoding processing computing unit, and each of random numbers produced by the random number generator is transmitted to the address bus commonly connected with the central processing unit, storage circuit and encoding processing computing unit as a pseudo address signal in association with the data transfer, whereby decoding of the address signal sent to the storage circuit can be rendered difficult and a current waveform about data transferred based on the pseudo address signal can be disturbed, thus making it possible to invalidate an attack using each current waveform while the simplification of a register is being carried out.

(39) In addition to the above, an effect is obtained in that the encoding process or decoding process includes an exponential residue multiplying operation applicable to RSA cryptography or the like, and the encoding processing computing unit alternately computes $A=A^2$ modN and $A=AB$modN with $A=1$ and $B=X$ in response to X, Y and N inputted thereto, computes $A=A^2$ modN corresponding to plural bits as viewed by plural bits from a high order of Y upon such computation, and brings the value of B necessary for the computation of ABmodN in association with combinations of the plural bits, whereby the speeding up and security of an encoding process can be realized.

(40) An effect is obtained in that in a microcomputer having a module configuration including an input-output operation of data with an encoding process or a decoding process based on an encoding processing computing unit operated in response to instructions given from a central processing unit, the encoding processing computing unit is provided with each of registers, which stores data used for a computation for the encoding process or decoding process in plural bit units, and data necessary prior to the encoding process or the decoding process is stored in the register, whereby the need for the transfer of data in the process of a computing operation can be eliminated, thus making it possible to neutralize or invalidate an attack using each current waveform.

(41) In addition to the above, an effect is obtained in that each circuit referred to above is formed on one semiconductor substrate, thereby making it possible to realize the strengthening of security while a reduction in module is being executed.

(42) An effect is obtained in that in a microcomputer having a module configuration including an input-output operation of data with an encoding process or a decoding process based on an encoding processing computing unit operated in response to instructions given from a central processing unit, the encoding processing computing unit is provided with a signal path for capturing data used for the next computation from a storage circuit concurrently with a computing operation for the encoding process or decoding process, whereby the computing operation and data transfer can be carried out simultaneously and hence an attack using each current waveform can be invalidated while the register is being simplified.

(43) An effect is obtained in that in a microcomputer having a module configuration in which a central processing unit, a storage circuit, an encoding processing computing unit and a random number generator are connected to a common address bus, and which includes an input-output operation of data with an encoding process or a decoding process based on the encoding processing computing unit and the storage circuit operated in response to instructions given from the central processing unit, a leading address for data used for the encoding process or decoding process is supplied from the central processing unit to the storage circuit, which reads data according to an address signal formed by an address generating circuit built therein, followed by data-transfer to the encoding processing computing unit, and each of random numbers produced by the random number generator is transmitted to the address bus commonly connected with the central processing unit, storage circuit and encoding processing computing unit as a pseudo address signal in association with the data transfer, whereby a current waveform about data transferred based on the pseudo address signal can be disturbed, thereby making it possible to invalidate an attack using each current waveform while the simplification of each circuit is being carried out.

(44) An effect is obtained in that in a microcomputer having a module configuration in which a central processing unit, a storage circuit, an encoding processing computing unit and a random number generator are connected to a common address bus, and which includes an input-output operation of data with an encoding process or a decoding process based on the encoding processing computing unit and the storage circuit operated in response to instructions given from the central processing unit, the central processing unit encrypts or encodes a leading address of data for the encoding process or decoding process by using each of random numbers generated by the random number generator and supplies the same to the storage circuit, which decodes the address signal by using the random number to generate a leading address, thereby reading data, based on an address signal formed based on the leading address, followed by transfer to the encoding processing computing unit, and each of random numbers produced by the random number generator is transmitted to the address bus commonly connected with the central processing unit, storage circuit and encoding processing computing unit as a pseudo address signal in association with the data transfer, whereby a current waveform about data transferred based on the pseudo address signal can be disturbed while decoding of the address signal sent to the storage circuit is being made difficult, thereby making it possible to invalidate an attack using each current waveform while the simplification of each circuit is being carried out.

While the invention made by the present inventors has been described above specifically by the embodiments, the invention of the present application is not limited to the embodiments. It is needless to say that various changes can be made thereto within the scope not departing from the substance thereof. For example, an IC card may be one equipped with a plurality of semiconductor integrated circuit devices in addition to one equipped with one semiconductor integrated circuit. A microcomputer may be one wherein a CPU and its peripheral circuits are made up of plural chips and mounted on one module substrate.

Figure 25:
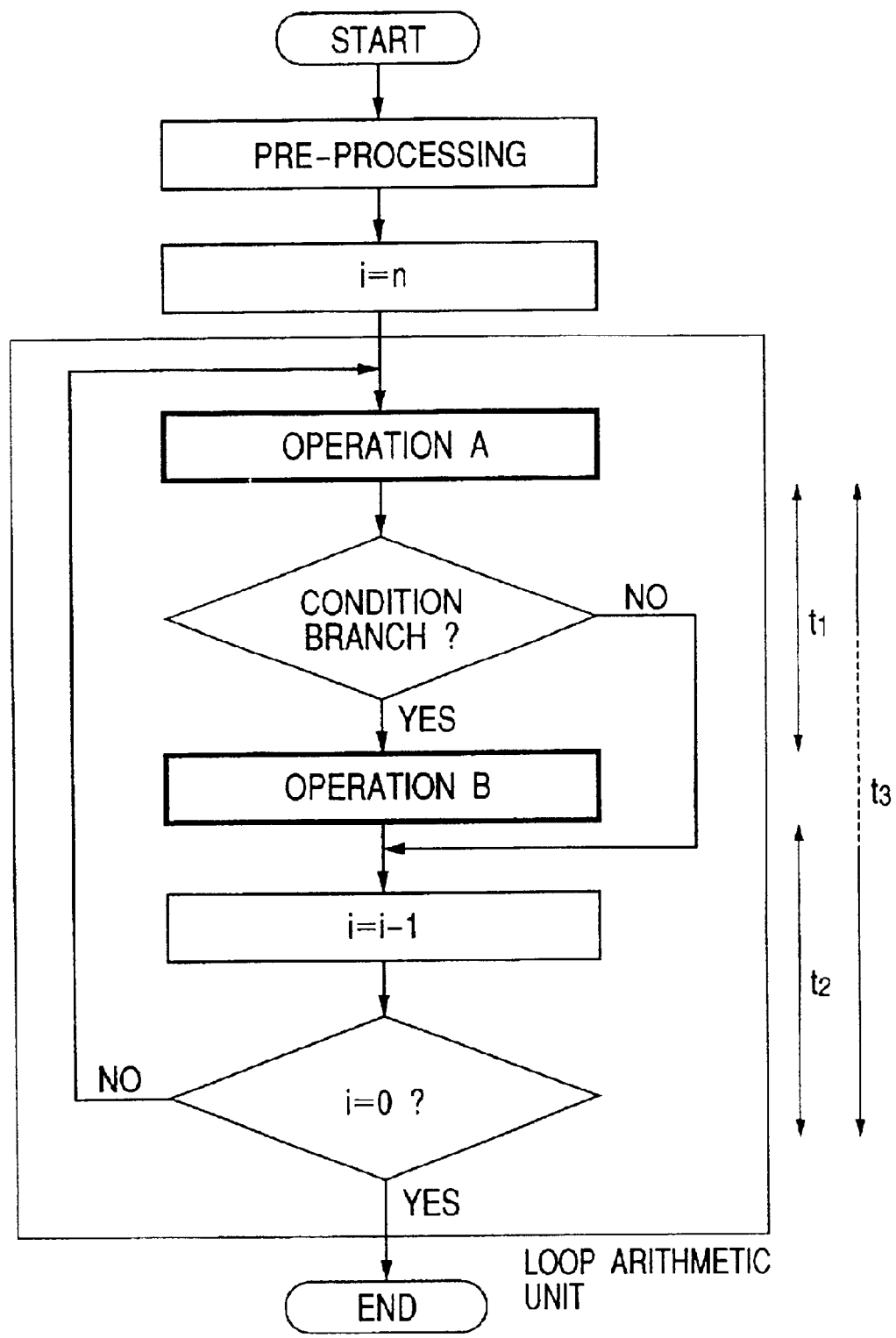
FIG. 25 is a flowchart for describing an arithmetic operation to which the present invention is applicable.

In addition to the exponential residue multiplying method of performing the encoding process, a computing process can be widely used in, for example, a case in which the following computing process is selectively added in association with the presence or absence of an overflow at a computing process or computing operation having an operation or computation A and an operation or computation B as indicated by a flowchart shown in FIG. 25 and having a branch as to whether the operation B should be done according to the result of the operation A. That is, if such a computing process as to execute the operation B after the operation A and invalidate, if the operation B is found to be unnecessary from the result of the operation A, the result of operation thereof is carried out, then this would be useful as an operation analytical countermeasure against data processing which needs a secret operation other than the encoding process.

As the microcomputer, any type may be used if the input/output of data is performed according to a data procedure based on a data processing device inclusive of the data processing device and a ROM in which the data procedure has been written. The present invention can be widely applied to, for example, various microcomputers requiring security as in one-chip microcomputer or the like for a game or the like in addition to the above-described IC card chip. Further, the present invention can be widely used in various IC card and microcomputers which need security.

Effects obtained by typical ones of the inventions disclosed in the present application will be described in brief as follows: In an IC card supplied with an operating voltage by an electrical connection between each of external terminals and a read/write device, and including an input-output operation of data with an encoding process or a decoding process, a disturbance-aimed processing operation is included in the encoding process or decoding process to uniformalize timings provided to operate an internal circuit and its operating current, whereby decoding using each of current waveforms can be made difficult.

In a microcomputer having a module configuration including an input-output operation of data with an encoding process or a decoding process, a disturbance-aimed processing operation is included in the encoding process or decoding process to uniformalize timings provided to operate an internal circuit and its operating current, whereby decoding using each current waveform with respect to the moduled microcomputer can be made difficult.

Effects obtained by typical ones of the inventions disclosed in the present application will be described in brief as follows: In an IC card supplied with an operating voltage by an electrical connection between each of external terminals and a read/write device, and including an input-output operation of data with an encoding process or a decoding process based on an encoding processing computing unit operated in response to instructions issued from a central processing unit, the encoding processing computing unit is provided with each of registers, which stores data used for a computation for the encoding process or decoding process in plural bit units, and data necessary prior to the encoding process or the decoding process is taken in the register, whereby the need for the transfer of data in the process of a computing operation can be eliminated, thus making it possible to neutralize or invalidate an attack using each current waveform.

In a microcomputer having a module configuration including an input-output operation of data with an encoding process or a decoding process based on an encoding processing computing unit operated in response to instructions given from a central processing unit, the encoding processing computing unit is provided with each of registers, which stores data used for a computation for the encoding process or decoding process in plural bit units, and data necessary prior to the encoding process or the decoding process is stored in the register, whereby the need for the transfer of data in the process of a computing operation can be eliminated, thereby making it possible to invalidate an attack using each current waveform.

What is claimed is:

1. An IC card supplied with an operating voltage by an electrical connection between each of external terminals and a read/write device, and including an input-output operation of data with an encoding process or a decoding process being executed by an encoding processing computing unit operated in response to instructions issued from a central processing unit, and further using random numbers generated by a random number generator as pseudo address signals to transfer data to the encoding processing computing unit, said encoding processing computing unit including registers, which store data used for a computation for the encoding process or the decoding process prior to performing the encoding process or the decoding process, and wherein said registers further store calculated results from the computation for the encoding process or the decoding process.

2. Tne IC card according to claim 1, wherein said encoding process or decoding process includes an exponential residue multiplying operation, and said encoding processing computing unit alternately computes A=$A^2$ mod N and A=AB mod N with A=1 and B=X in response to X, Y and N being input thereto for each of a plurality of bits in Y starting from a high order bit of Y, and the value of B being read from the registers.

3. An IC card supplied with an operating voltage by an electrical connection between each of external terminals and a read/write device, and including an input-output operation of data with an encoding process or a decoding process being executed by an encoding processing computing unit operated in response to instructions issued from a central processing unit, and further using random numbers generated by a random number generator as pseudo address signals to transfer data to the encoding processing computing unit, said encoding processing computing unit including a signal path and capturing data to be used for a next computation from a storage circuit concurrently with a computing operation for the encoding process or the decoding process via said signal path.

4. The IC card according to claim 3, wherein the encoding process or the decoding process includes an exponential residue multiplying operation, and said encoding processing computing unit alternately computes A=$A^2$ mod N and A=AB mod N with A=1 and B=X in response to X, Y and N being input thereto, for each of a plurality of bits in Y starting from a high order bit of Y, and the value of B being read from the storage circuit concurrently with said computation of $A^2$ mod N.

5. An IC card, which is supplied with an operating voltage by an electrical connection between each of external terminals and a read/write device, the IC card comprising:

a central processing unit, a storage circuit, an encoding processing computing unit and a random number generator each connected to a common address bus;

wherein an input-output operation of data with an encoding process or a decoding process is executed by the encoding processing computing unit and the storage circuit operated in response to instructions given from the central processing unit, wherein said central processing unit supplies a leading address at which data for the encoding process or the decoding process is stored, to the storage circuit, and the storage circuit reads the data, based on an address signal formed by a built-in address generating circuit based on the leading address and transfers the data to the encoding processing computing unit, and each of a plurality of random numbers produced by the random number generator is transmitted to an address bus commonly connected with the central processing unit, the storage circuit and the encoding processing computing unit as a pseudo address signal in association with the data transfer.

6. The IC card according to claim 5, wherein the encoding process or the decoding process includes an exponential residue multiplying operation, and said encoding processing computing unit alternately computes A=$A^2$ mod N and A=AB mod N with A=1 and B=X in response to X, Y and N being input thereto, for each of a plurality of bits in Y starting from a high order bit of Y, and the value of B being read from the storage circuit in association with combinations of the plurality of bits.

7. An IC card, which is supplied with an operating voltage by an electrical connection between each of external terminals and a read/write device, the IC card comprising:

a central processing unit, a storage circuit, an encoding processing computing unit and a random number generator each connected to a common address bus;

wherein an input-output operation of data with an encoding process or a decoding process is executed by the encoding processing computing unit and the storage circuit operated in response to instructions given from the central processing unit, said central processing unit supplies an encoded address signal formed using each of a plurality of random numbers produced by the random number generator to the storage circuit, which decodes the address signal through the use of the random number to generate a leading address, said storage circuit reads data for the encoding process or the decoding process, based on the address signal produced by a built-in address generating circuit on the basis of the leading address and transfers the data to the encoding processing computing unit, and each of the plurality of random numbers produced by the random number generator is transmitted to the address bus that is commonly connected with the central processing unit, the storage circuit and the encoding processing computing unit as a pseudo address signal in association with the data transfer.

8. The IC card according to claim 7, wherein said encoding process or decoding process includes an exponential residue multiplying operation, and said encoding processing computing unit alternately computes A=$A^2$ mod N and A=AB mod N with A=1 and B=X in response to X, Y and N being input thereto, for each of a plurality of bits in Y starting from a high order bit of Y, and the value of B being read from the storage circuit in association with combinations of the plurality of bits.

9. A microcomputer having a module configuration including an input-output operation of data with an encoding process or a decoding process executed by an encoding processing computing unit operated in response to instructions given from a central processing unit, and further using random numbers generated by a random number generator as pseudo address signals to transfer data to the encoding processing computing unit, said encoding processing computing unit including registers, which store data used for a computation for the encoding process or the decoding process prior to performing the encoding process or the decoding process, said registers to store calculated results from the computation for the encoding process or the decoding process.

10. The microcomputer according to claim 9, wherein said module configuration is formed on one semiconductor substrate for the implementation thereof.

11. A microcomputer having a module configuration, and an input-output operation of data with an encoding process or a decoding process executed by an encoding processing computation unit operated in response to instructions issued from a central processing unit, and further using random numbers generated by a random number generator as pseudo address signals to transfer data to the encoding processing computing unit, said encoding processing computing unit including a signal path and capturing data used for the next computation from a storage circuit concurrently with a computing operation for the encoding process or the decoding process via said signal path.

12. A microcomputer having a module configuration in which a central processing unit, a storage circuit, an encoding processing computing unit and a random number generator are each connected to a common address bus;

wherein an input-output operation of data with an encoding process or a decoding process is executed by the encoding processing computing unit and the storage circuit operated in response to instructions given from the central processing unit, said central processing unit supplies a leading address at which data for the encoding or the decoding process is stored, to the storage circuit, said storage circuit reads data, based on an address signal formed by a built-in address generating circuit based on the leading address and transfers the data to the encoding processing computing unit, and said random number generator transmits each of a plurality of produced random numbers to an address bus that is commonly connected with the central processing unit, the storage circuit and the encoding processing computing unit as a pseudo address signal in association with the data transfer.

13. A microcomputer having a module configuration in which a central processing unit, a storage circuit, an encoding processing computing unit and a random number generator are each connected to a common address bus; and which has an input-output operation of data with an encoding process or a decoding process executed by the encoding processing computing unit and the storage circuit operated in response to instructions given from the central processing unit, wherein said central processing unit supplies an encoding address signal formed using each of a plurality of random numbers produced by the random number generator, to the storage circuit, said storage circuit decodes the encoded address signal supplied from the central processing unit by using the random number to thereby generate a leading address, reads data for the encoding or decoding process and transfers the data to the encoding processing computing unit, and said random number generator transmits each of the plurality of produced random numbers to the address bus that is commonly connected with the central processing unit, the storage circuit and the encoding processing computing unit as a pseudo address signal in association with the data transfer.

* * * * *